United States Patent
Takenaka et al.

(10) Patent No.: US 10,266,200 B2
(45) Date of Patent: Apr. 23, 2019

(54) WORK VEHICLE AND METHOD FOR CONTROLLING WORK VEHICLE

(71) Applicant: KOMATSU LTD., Tokyo (JP)

(72) Inventors: Yuita Takenaka, Tokyo (JP); Masanobu Nakabayashi, Tokyo (JP); Masanori Ikari, Tokyo (JP)

(73) Assignee: KOMATSU LTD., Tokyo (JP)

( * ) Notice: Subject to any disclaimer, the term of this patent is extended or adjusted under 35 U.S.C. 154(b) by 13 days.

(21) Appl. No.: 15/556,137

(22) PCT Filed: Oct. 26, 2016

(86) PCT No.: PCT/JP2016/081728
§ 371 (c)(1),
(2) Date: Sep. 6, 2017

(87) PCT Pub. No.: WO2017/073612
PCT Pub. Date: May 4, 2017

(65) Prior Publication Data
US 2018/0043929 A1 Feb. 15, 2018

(30) Foreign Application Priority Data
Oct. 30, 2015 (JP) .................................. 2015-213788

(51) Int. Cl.
*B62D 5/09* (2006.01)
*B62D 5/06* (2006.01)
(Continued)

(52) U.S. Cl.
CPC ................. *B62D 5/09* (2013.01); *B62D 1/12* (2013.01); *B62D 5/0469* (2013.01); *B62D 5/06* (2013.01);
(Continued)

(58) Field of Classification Search
CPC .................................. B62D 5/09; B62D 12/00
See application file for complete search history.

(56) References Cited

U.S. PATENT DOCUMENTS 6,179,082 B1 * 1/2001 Ikari ........................ B62D 5/06
180/418
9,809,263 B2 * 11/2017 Mitchell .............. B62D 51/008
(Continued)

FOREIGN PATENT DOCUMENTS

CN  101568460 A  10/2009
CN  101959741 A  1/2011
(Continued)

OTHER PUBLICATIONS

The International Search Report for the corresponding international application No. PCT/JP2016/081728, dated Jan. 24, 2017.
(Continued)

*Primary Examiner* — Kevin Hurley
(74) *Attorney, Agent, or Firm* — Global IP Counselors, LLP

(57) ABSTRACT

An articulated work vehicle with linked front and rear frames includes a hydraulic actuator, a joystick lever operated by an operator, a control valve, a force imparting component, and a controller. The hydraulic actuator is driven hydraulically to change a steering angle of the front frame with respect to the rear frame. The control valve is linked to the joystick lever, to control flow of fluid supplied to the hydraulic actuator according to an operation amount of the joystick lever, and to restrict the operation amount of the joystick lever to a predetermined range. The force imparting component imparts an assist force or a counterforce to the operation of the joystick lever by the operator. The controller controls the force imparting component so as to decrease the assist force or increase the counterforce
(Continued)

before the operation of the joystick lever is restricted by the control valve.

9 Claims, 13 Drawing Sheets

(51) Int. Cl.
| | | |
|---|---|---|
| *B62D 12/00* | (2006.01) | |
| *B62D 1/12* | (2006.01) | |
| *B62D 6/00* | (2006.01) | |
| *B62D 15/02* | (2006.01) | |
| *E02F 9/22* | (2006.01) | |
| *E02F 9/08* | (2006.01) | |
| *E02F 9/20* | (2006.01) | |
| *B62D 5/04* | (2006.01) | |
| *B62D 5/083* | (2006.01) | |

(52) U.S. Cl.
CPC ........... *B62D 5/0832* (2013.01); *B62D 6/002* (2013.01); *B62D 12/00* (2013.01); *B62D 15/021* (2013.01); *E02F 9/0841* (2013.01); *E02F 9/2004* (2013.01); *E02F 9/225* (2013.01)

(56) References Cited

U.S. PATENT DOCUMENTS

| | | |
|---|---|---|
| 2008/0041655 A1 | 2/2008 | Breiner et al. |
| 2008/0162000 A1 | 7/2008 | Dattilo et al. |
| 2010/0307857 A1 | 12/2010 | Shinagawa |
| 2015/0210310 A1 | 7/2015 | Akatsuka et al. |
| 2016/0319848 A1 | 11/2016 | Tanaka et al. |
| 2018/0105202 A1* | 4/2018 | Ikari ..................... B62D 5/04 |
| 2018/0105203 A1* | 4/2018 | Takenaka ............... B62D 5/065 |
| 2018/0170369 A1* | 6/2018 | Mitchell ............... B62D 15/029 |

FOREIGN PATENT DOCUMENTS

| | | |
|---|---|---|
| CN | 102530055 A | 7/2012 |
| CN | 104520167 A | 4/2015 |
| DE | 10 2012 107 595 A1 | 2/2014 |
| JP | 2-68269 U | 5/1990 |
| JP | 4-59483 A | 2/1992 |
| JP | 11-105723 A | 4/1999 |
| JP | 11-321664 A | 11/1999 |
| JP | 2002-331944 A | 11/2002 |
| JP | 2015-127164 A | 12/2015 |

OTHER PUBLICATIONS

The Office Action for the corresponding Chinese application No. 201680013322.7, dated Jan. 4, 2019.

* cited by examiner

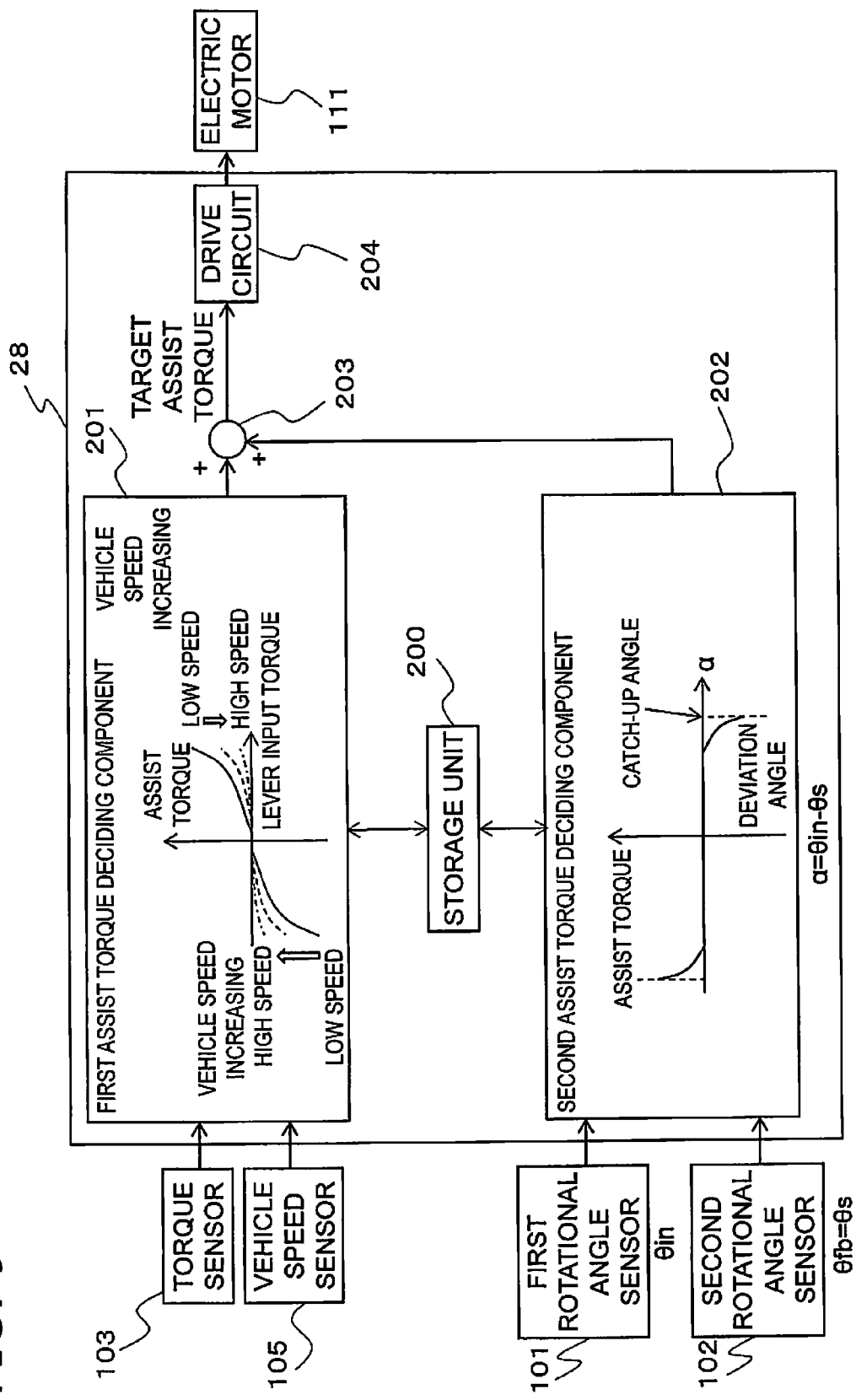

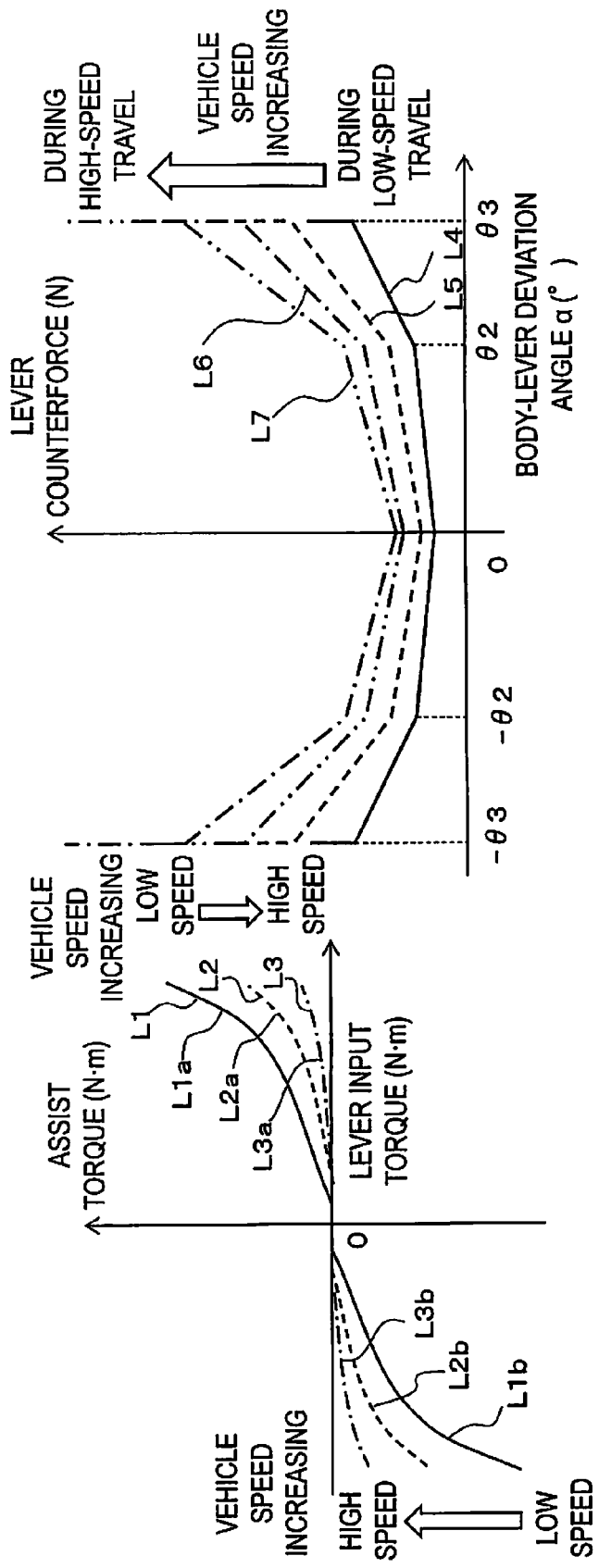

WORK VEHICLE AND METHOD FOR CONTROLLING WORK VEHICLE

CROSS-REFERENCE TO RELATED APPLICATIONS

This application is a U.S. National stage application of International Application No. PCT/JP2016/081728, filed on Oct. 26, 2016. This U.S. National stage application claims priority under 35 U.S.C. § 119(a) to Japanese Patent Application No. 2015-213788, filed in Japan on Oct. 30, 2015, the entire contents of which are hereby incorporated herein by reference.

BACKGROUND

Field of the Invention

The present invention relates to a work vehicle and a method for controlling a work vehicle.

Description of the Related Art

An articulated work vehicle has been disclosed with a configuration in which the steering angle is changed by controlling the flow of fluid supplied to a hydraulic actuator disposed from the front frame to the rear frame (see Japanese Laid-Open Patent Application H11-105723 and Japanese Patent Laid-Open Patent Application 11-321664, for example).

The work vehicles in Japanese Laid-Open Patent Application H11-105723 and Japanese Patent Laid-Open Patent Application 11-321664 are provided with a steering valve that adjusts the flow of fluid supplied to a hydraulic actuator according to an inputted pilot pressure, and a pilot valve that adjusts the pilot pressure supplied to the steering valve.

The pilot valve is provided with an operation input shaft and a feedback input shaft that are able to rotate relative to each other. The operation input shaft is linked to the joystick lever and rotates according to the rotational angle of the joystick lever. The feedback input shaft is linked to the front frame by a linking mechanism, and rotates according to the change in steering angle.

Such a pilot valve adjusts the pilot pressure inputted to the steering valve according to the difference between the rotational angle of the operation input shaft and the rotational angle of the feedback input shaft. The flow of fluid supplied from the steering valve to the hydraulic actuator is changed according to the adjusted pilot pressure, and the steering angle is changed.

Thus, the operator can change the steering angle by operating the joystick lever to rotate the operation input shaft of the pilot valve.

SUMMARY

With the pilot valve in the work vehicles of the abovementioned Japanese Laid-Open Patent Application H11-105723 and Japanese Patent Laid-Open Patent Application 11-321664, however, since the amount of displacement of the operation input shaft with respect to the feedback input shaft is mechanically restricted to within a predetermined range, when the operator operates the joystick lever to rotate the operation input shaft and the amount of displacement reaches the restricted position (hereinafter also referred to as during catch-up), the operator's wrist is subjected to a sudden recoil.

Thus, a problem has been that a burden is placed on the wrist of the operator by the sudden recoil caused by displacement restriction of the valve.

In light of the above problems encountered with conventional work vehicles, it is an object of the present invention to provide a work vehicle and a work vehicle control method with which the sudden recoil caused by displacement restriction of the valve can be mitigated.

The work vehicle pertaining to the first aspect is an articulated work vehicle in which a front frame and a rear frame are linked, comprising a hydraulic actuator, a joystick lever, a control valve, a force imparting component, and a controller. The hydraulic actuator is driven hydraulically and changes the steering angle of the front frame with respect to the rear frame. The joystick lever is operated by an operator. The control valve is linked to the joystick lever, controls the flow of fluid supplied to the hydraulic actuator according to the operation amount of the joystick lever, and restricts the operation amount of the joystick lever to a predetermined range. The force imparting component imparts an assist force or a counterforce to the operation of the joystick lever by the operator. The controller controls the force imparting component so as to decrease the assist force or increase the counterforce before the operation of the joystick lever is restricted by the control valve.

Consequently, the operating force required to operate the joystick lever increases before the operation of the joystick lever is restricted. That is, since the tactile sensation gradually becomes heavier from before the joystick lever is restricted, the operation speed becomes slower as the joystick lever approaches the restricted position. Therefore, the sudden recoil caused by valve displacement restriction can be mitigated.

The work vehicle pertaining to the second aspect is the work vehicle pertaining to the first aspect, wherein the rotational angle of the joystick lever corresponds to the target steering angle of the front frame with respect to the rear frame. The work vehicle further comprises a target steering angle sensor and an actual steering angle sensor. The target steering angle sensor senses the target steering angle. The actual steering angle sensor senses the actual steering angle. The control valve restricts the movement of the joystick lever when the angular difference between the target steering angle and the actual steering angle reaches a first predetermined angle difference. The controller controls the force imparting component so that the assist force is gradually decreased or the counterforce is gradually increased toward the first predetermined angle difference, on the basis of the angular difference.

Thus, the approach to the restricted position can be detected by the angular difference between the target steering angle and the actual steering angle, and the operating force required to operate the joystick lever can be increased before the operation of the joystick lever is restricted.

The work vehicle pertaining to the third aspect is the work vehicle pertaining to the second aspect, wherein the control valve has a first input member, a second input member, and a restrictor. The first input member is linked to the joystick lever and is displaced according to the operation of the joystick lever. The second input member is displaced according to the actual steering angle. The restrictor restricts the displacement of the first input member to within a predetermined range and thereby restricts the operation amount of the joystick lever to within a predetermined range. The biasing component biases the first input member to a neutral position where the amount of displacement of the first input member matches the amount of displacement of the second input member. The difference between the amount of displacement of the first input member and the amount of displacement of the second input member corresponds to the angular difference. The joystick lever is operated against the biasing force of the biasing component.

Consequently, after the joystick lever is operated, the steering angle changes to follow the joystick lever, and the control valve goes into the neutral position when the operation amount of the joystick lever matches the steering angle. Also, the control valve is thus provided with the biasing component, and the operator operates the joystick lever with an operating force that goes against the biasing force of the biasing component. The operating force required to operate the joystick lever can be increased by decreasing the assist force or increasing the counterforce for operation against this biasing force before there is restriction.

The work vehicle pertaining to the fourth aspect is the work vehicle pertaining to the third aspect, wherein the restrictor has a striking member and a struck member. The striking member is linked to the first input member and is displaced according to the displacement of the first input member. The struck member is formed on a member connected to the second input member and is struck by the striking member. When the difference in the amount of displacement of the first input member with respect to the second input member reaches a value corresponding to the first predetermined angle difference, the striking member strikes the struck member and displacement of the first input member with respect to the second input member is restricted.

Consequently, the difference in the amount of displacement of the first input member with respect to the second input member is restricted to within the range of the predetermined angular difference.

The work vehicle pertaining to the fifth aspect is the work vehicle pertaining to the second aspect, further comprising a torque sensor. The torque sensor senses the torque produced by operation of the joystick lever. The controller controls the force imparting component on the basis of the torque sensor.

Consequently, a force can be applied according to the torque applied by the operator to the joystick lever. For example, the assist force imparted by the force imparting component can be increased when the torque applied to the joystick lever by the operator is high, and the assist force can be decreased when the torque is low.

The work vehicle pertaining to the sixth aspect is the work vehicle pertaining to the fifth aspect, wherein the controller has a calculator and an operation controller. The calculator calculates the force to be imparted to the operation of the joystick lever by combining an imparted force preset for the sensed torque with a counterforce preset for the angular difference. The operation controller actuates the force imparting component so as to impart the calculated force.

Consequently, the operating force required to operate the joystick lever can be increased before the operation of the joystick lever is restricted, while an assist force or a counterforce is imparted by the force imparting component to the operation of the joystick lever.

The work vehicle pertaining to the seventh aspect is the work vehicle pertaining to the sixth aspect, further comprising a speed sensor. The speed sensor senses the speed of the work vehicle. The calculator calculates the force to be imparted to the operation of the joystick lever by changing the imparted force preset for the torque on the basis of the sensed speed, and combining this changed imparted force with a counterforce preset for the angular difference.

Consequently, the force imparted to the operation of the joystick lever by the force imparting component according to torque can also be changed according to the speed of the vehicle, and furthermore, the operating force required to operate the joystick lever can be increased before the operation of the joystick lever is restricted.

The work vehicle pertaining to the eighth aspect is the work vehicle pertaining to the first aspect, further comprising a link. The link links the joystick lever to the control valve. The force imparting component has an electric motor and a transmission mechanism. The electric motor generates the assist force or the counterforce. The transmission mechanism transmits the assist force or the counterforce produced by the electric motor to the link.

Consequently, the force of the electric motor can be transmitted to the link that links the joystick lever to the control valve, and the force required to operate the joystick lever can be changed.

The method for controlling a work vehicle pertaining to the ninth aspect is a method for controlling an articulated work vehicle in which a front frame and a rear frame are linked, said method comprising a load increasing step. This load increasing step involves decreasing the assist force or increasing the counterforce to be imparted to the operation of the joystick lever before the operation of the joystick lever is restricted, with a control valve that controls the flow of fluid supplied to a hydraulic actuator that changes the steering angle of the front frame with respect to the rear frame according to the operation amount of the joystick lever.

Consequently, the operating force required to operate the joystick lever increases before the operation of the joystick lever is restricted. That is, since the tactile sensation gradually becomes heavier before the joystick lever is restricted, the operation speed slows down as the restricted position is approached. Accordingly, the sudden recoil caused by displacement restriction of the valve can be mitigated.

Effects of the Invention

The present invention provides a work vehicle and a method for controlling a work vehicle with which sudden recoil caused by displacement restriction of a valve can be mitigated.

BRIEF DESCRIPTION OF DRAWINGS

FIG. 9 is a block diagram showing the configuration of the controller in FIG. 2;

FIG. 10A is a graph of first assist torque information (assist torque applied versus lever input torque) provided for each speed stored in the storage unit in FIG. 9, and FIG. 10B is a graph of lever counterforce versus body-lever deviation angle when assist torque is and is not imparted on the basis of the first assist torque information in FIG. 9a;

DETAILED DESCRIPTION OF EMBODIMENT(S)

A wheel loader in an embodiment pertaining to the present invention will now be described through reference to the drawings.

Embodiment 1

1. Configuration
1-1. Overview of Wheel Loader Configuration

Figure 1:
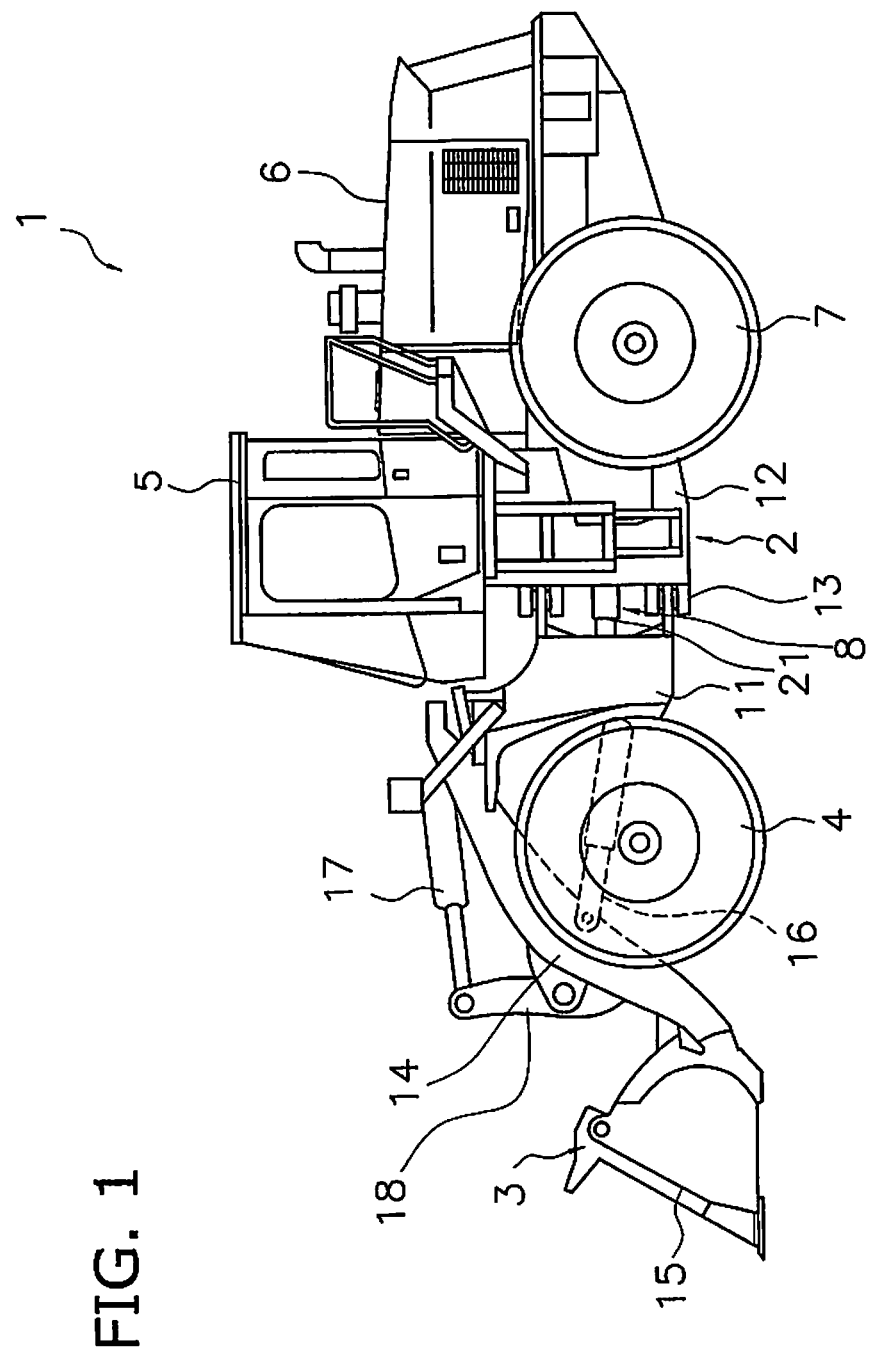
FIG. 1 is a side view of a wheel loader in an embodiment pertaining to the present invention.

FIG. 1 is a simplified diagram of the configuration of a wheel loader 1 in this embodiment. The wheel loader 1 in this embodiment comprises a body frame 2, a work implement 3, a pair of front tires 4, a cab 5, an engine compartment 6, a pair of rear tires 7, and a steering operating device 8 (see FIG. 2, discussed below).

The wheel loader 1 performs earth loading and other such work with the work implement 3.

The body frame 2 is what is known as an articulated type, and has a front frame 11, a rear frame 12, and a linking shaft 13. The front frame 11 is disposed in front of the rear frame 12. The linking shaft 13 is provided in the center of the vehicle width direction, and pivotably links the front frame 11 to the rear frame 12. The front tires 4 are attached on the left and right sides of the front frame 11. The rear tires 7 are attached on the left and right sides of the rear frame 12.

The work implement 3 is driven by hydraulic fluid from a work implement pump (not shown). The work implement 3 has a boom 14, a bucket 15, a lift cylinder 16, and a bucket cylinder 17. The boom 14 is mounted on the front frame 11. The bucket 15 is attached to the distal end of the boom 14.

The lift cylinder 16 and the bucket cylinder 17 are hydraulic cylinders. One end of the lift cylinder 16 is attached to the front frame 11, and the other end of the lift cylinder 16 is attached to the boom 14. The lift cylinder 16 telescopes in and out to pivot the boom 14 up and down. One end of the bucket cylinder 17 is attached to the front frame 11, and the other end of the bucket cylinder 17 is attached to the bucket 15 via a bell crank 18. The bucket cylinder 17 telescopes in and out to pivot the bucket 15 up and down.

The cab 5 is mounted on the rear frame 12, inside of which are disposed a steering wheel or joystick lever 24 (discussed below; see FIG. 2) for steering, a lever for controlling the work implement 3, various display devices, and so forth. The engine compartment 6 is disposed on the rear frame 12 to the rear of the cab 5, and houses an engine.

The steering operating device 8 will be discussed in detail below, but has steering cylinders 21 and 22. The amount of fluid supplied to the steering cylinders 21 and 22 is varied to change the steering angle of the front frame 11 with respect to the rear frame 12 and to change the travel direction of the wheel loader 1.

1-2. Steering Operation Device

Figure 2:
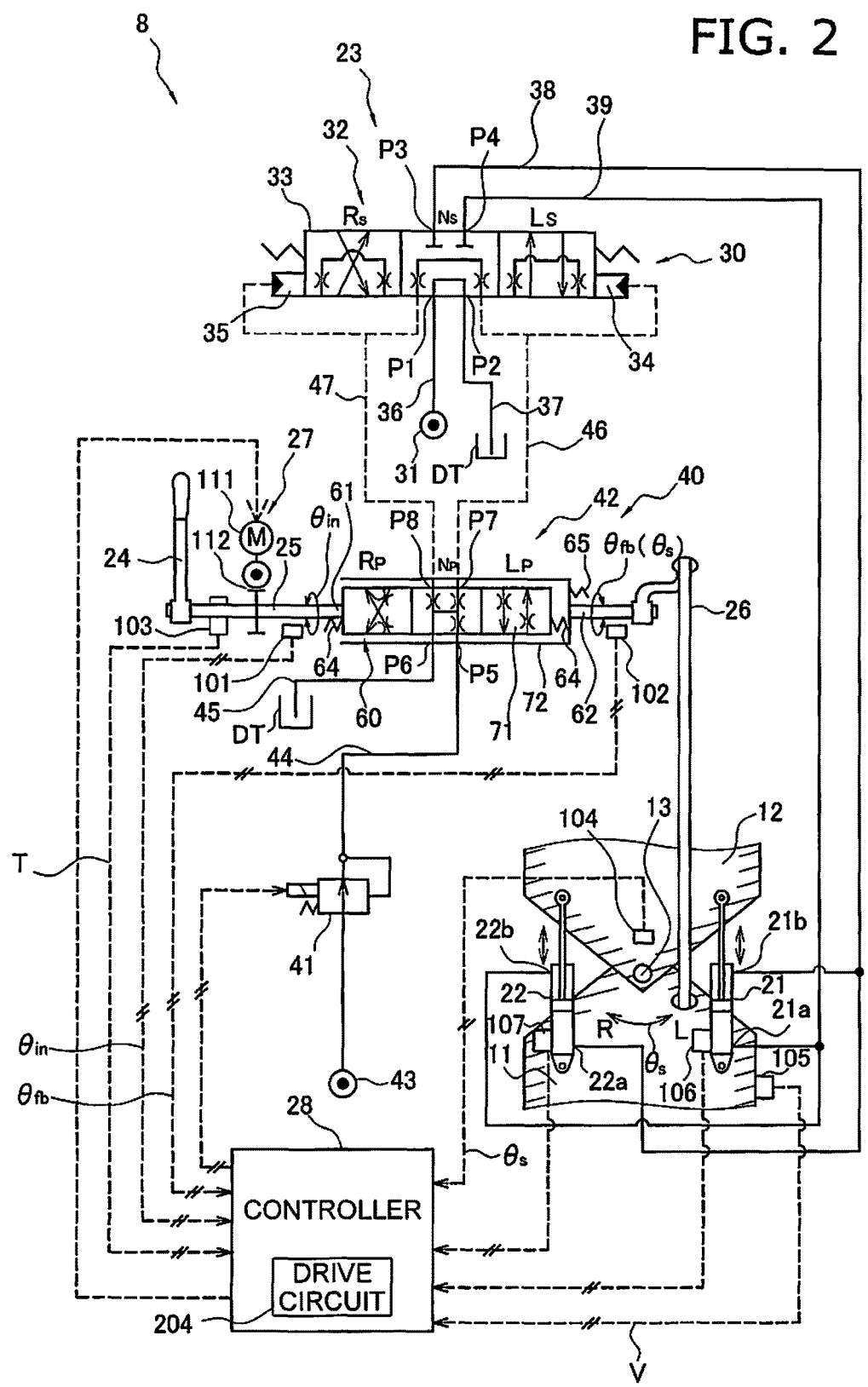
FIG. 2 is a hydraulic circuit diagram showing the configuration of a steering operation device of the wheel loader in FIG. 1.

FIG. 2 is a hydraulic circuit diagram of the configuration of the steering operation device 8. The steering operation device 8 in this embodiment mainly has a pair of steering cylinders 21 and 22, a steering hydraulic circuit 23, a joystick lever 24, a link 25, a linking mechanism 26, a force imparting component 27, and a controller 28.

1-2-1. Steering Cylinders

The steering cylinders 21 and 22 are driven hydraulically. The steering cylinders 21 and 22 are disposed side by side on the left and right sides in the vehicle width direction, flanking a linking shaft 13. The steering cylinder 21 is disposed on the left side of the linking shaft 13 (see FIG. 1). The steering cylinder 22 is disposed on the right side of the linking shaft 13. The steering cylinders 21 and 22 are attached at one end to the front frame 11, and at the other end to the rear frame 12.

The steering cylinder 21 is provided with an extension port 21a and a contraction port 21b, and the steering cylinder 22 is provided with an extension port 22a and a contraction port 22b.

When fluid is supplied to the extension port 21a of the steering cylinder 21 and the contraction port 22b of the steering cylinder 22 and fluid is discharged from the contraction port 21b of the steering cylinder 21 and the extension port 22a of the steering cylinder 22, the steering cylinder 21 extends and the steering cylinder 22 contracts. As a result, the steering angle θs changes and the vehicle turns to the right. When fluid is supplied to the contraction port 21b of the steering cylinder 21 and the extension port 22a of the steering cylinder 22 and fluid is discharged from the extension port 21a of the steering cylinder 21 and the contraction port 22b of the steering cylinder 22, the steering cylinder 21 contracts and the steering cylinder 22 extends. As a result, the steering angle θs changes and the vehicle turns to the left.

A steering angle sensor 104 for detecting a steering angle θs is provided near the linking shaft 13 disposed arranged between the steering cylinders 21 and 22. The steering angle sensor 104 is constituted by a potentiometer, for example, and the sensed steering angle θs is sent to the controller 28 as a sensing signal.

The steering cylinder 21 is provided with a cylinder stroke sensor 106 for detecting the stroke of the cylinder, and the steering cylinder 22 is provided with a cylinder stroke sensor 107 for detecting the stroke of the cylinder. Sensing values from these cylinder stroke sensors 106 and 107 may be sent to the controller 28 to find the steering angle θs.

1-2-2. Steering Hydraulic Circuit

The steering hydraulic circuit 23 is a hydraulic circuit for adjusting the flow of fluid supplied to the steering cylinders 21 and 22. The steering hydraulic circuit 23 has a main hydraulic circuit 30 and a pilot hydraulic circuit 40.

(a) Main Hydraulic Path

The main hydraulic circuit 30 is a circuit that supplies fluid from a main hydraulic pressure source 31 to the steering cylinders 21 and 22, and has a steering valve 32. The main hydraulic pressure source 31 is made up of a hydraulic pump, a relief valve, and the like.

The steering valve 32 is a flow control valve that adjusts the flow of the fluid supplied to the steering cylinders 21 and 22 according to the inputted pilot pressure. The steering valve 32 has a main pump port P1, a main drain port P2, a first steering port P3, and a second steering port P4. The main pump port P1 is connected to the main hydraulic pressure source 31 via a main hydraulic line 36. The main drain port P2 is connected to a drain tank DT that collects fluid via the main drain line 37. The first steering port P3 is connected to the contraction port 21b of the steering cylinder 21 and the extension port 22a of the steering cylinder 22 via a first steering line 38. The second steering port P4 is connected to the extension port 21a of the steering cylinder 21 and the contraction port 22b of the steering cylinder 22 via a second steering line 39.

Also, the steering valve 32 has a valve body 33 that can move between a neutral position Ns, a left steering position Ls, and a right steering position Rs. When the valve body 33 is in the neutral position Ns, the main pump port P1 communicates with the main drain port P2. In this case, the first steering port P3 and the second steering port P4 are not in communication. When the valve body 33 is in the left steering position Ls, the main pump port P1 communicates with the first steering port P3, and the main drain port P2 communicates with the second steering port P4. When the valve body 33 is in the right steering position Rs, the main pump port P1 communicates with the second steering port P4, and the main drain port P2 communicates with the first steering port P3.

The steering valve 32 has a first pilot chamber 34 and a second pilot chamber 35. In a state in which no pilot pressure is supplied to the first pilot chamber 34 or the second pilot chamber 35, and the same pilot pressure is supplied to the first pilot chamber 34 and the second pilot chamber 35, the valve body 33 is in the neutral position Ns. In a state in which the pilot pressure is supplied only to the first pilot chamber 34, the valve body 33 is located in the left steering position Ls. In a state in which the pilot pressure is supplied only to the second pilot chamber 35, the valve body 33 is located in the right steering position Rs. When the valve body 33 is located in the left steering position Ls and the right steering position Rs, the steering valve 32 changes the opening surface area through which the fluid from the main hydraulic pressure source 31 passes according to the supplied pilot pressure. Consequently, the steering valve 32 controls the flow of fluid supplied to the steering cylinder 21 or the steering cylinder 22 according to the pilot pressure.

(b) Pilot Hydraulic Circuit

The pilot hydraulic circuit 40 is a circuit for supplying the fluid from the pilot hydraulic pressure source 43 to the first pilot chamber 34 and the second pilot chamber 35 of the steering valve 32.

The pilot hydraulic circuit 40 has a variable pressure reducer 41 and a pilot valve 42.

(i) Variable Pressure Reducer

The variable pressure reducer 41 reduces and adjusts the hydraulic pressure sent from the pilot hydraulic pressure source 43 to the pilot valve 42. The variable pressure reducer 41 incorporates an electromagnetic pressure reducing valve, and receives a command signal from the controller 28 to control the hydraulic pressure.

(ii) Pilot Valve

The pilot valve 42 is a rotary valve that adjusts the pilot pressure inputted from the pilot hydraulic pressure source 43 to the steering valve 32.

Overview of Pilot Valve Configuration

The rotary pilot valve 42 has a pilot pump port P5, a pilot drain port P6, a first pilot port P7, and a second pilot port P8. The pilot pump port P5 is connected to the variable pressure reducer 41 via a pilot hydraulic line 44, and the variable pressure reducer 41 is connected to the pilot hydraulic pressure source 43. The pilot drain port P6 is connected to the drain tank DT for recovering fluid via a pilot drain line 45. The first pilot port P7 is connected to the first pilot chamber 34 of the steering valve 32 via a first pilot line 46. The second pilot port P8 is connected to the second pilot chamber 35 of the steering valve 32 via a second pilot line 47.

The pilot valve 42 has a valve body component 60 that includes an operation spool 71 and an operation sleeve 72. With the operation sleeve 72 as a reference, the operation spool 71 can move between a neutral position Np, a left pilot position Lp, and a right pilot position Rp.

When the operation spool 71 is in the neutral position Np with respect to the operation sleeve 72, the pilot pump port P5, the pilot drain port P6, the first pilot port P7, and the second pilot port P8 communicate with each other. When the operation spool 71 in the left pilot position Lp with respect to the operation sleeve 72, the pilot pump port P5 communicates with the first pilot port P7, and the pilot drain port P6 communicates with the second pilot port P8. Also, when the operation spool 71 is in the right pilot position Rp with respect to the operation sleeve 72, the pilot pump port P5 communicates with the second pilot port P8, and the pilot drain port P6 communicates with the first pilot port P7.

Figure 3:
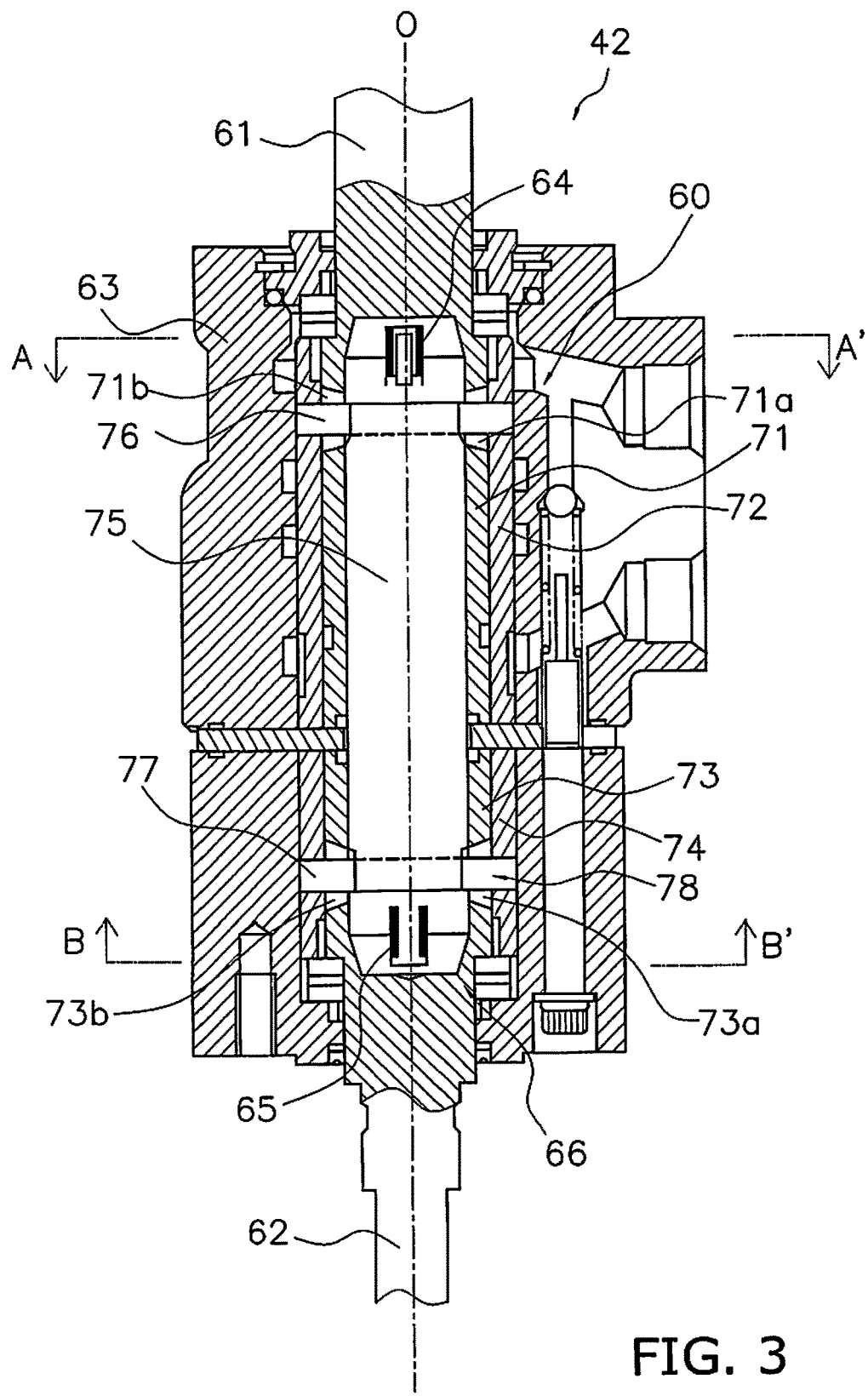
FIG. 3 is a cross section of the configuration of the pilot valve in FIG. 2.

FIG. 3 is a cross section of the configuration of the pilot valve 42.

The pilot valve 42 mainly has the valve body component 60, an operation input shaft 61, a feedback input shaft 62, a housing 63, a first spring 64, a second spring 65, and a feedback component 66.

Operation Input Shaft

The operation input shaft 61 is provided so as to be rotatable around its center axis O, and is inserted into the housing 63. The operation input shaft 61 is linked to the joystick lever 24 (discussed below) via the link 25. The operation input shaft 61 rotates at the same rotational angle as the rotational angle θin to the left and right of the joystick lever 24.

Feedback Input Shaft

The feedback input shaft 62 is disposed coaxially with the operation input shaft 61, and is provided so as to be rotatable around the center axis O. The feedback input shaft 62 is inserted into the housing 63 so as to be opposite the operation input shaft 61. The feedback input shaft 62 is linked to the front frame 11 via a linking mechanism 26 (discussed below) and rotates at the same rotational angle as the steering angle θs of the front frame 11 with respect to the rear frame 12.

Housing

A substantially cylindrical space is formed in the housing 63, and the operation input shaft 61 and the feedback input shaft 62 are inserted as mentioned above. The housing 63 accommodates the valve body component 60 and the feedback component 66, and the pilot pump port P5, the pilot drain port P6, the first pilot port P7, and the second pilot port P8 are formed.

Valve Body Component

The valve body component 60 has the operation spool 71 and the operation sleeve 72, and moves between the neutral position Np, the left pilot position Lp, and the right pilot position Rp when the operation spool 71 rotates with respect to the operation sleeve 72.

The operation spool 71 is substantially cylindrical in shape and disposed coaxially with the operation input shaft 61, and is connected to the operation input shaft 61. The joystick lever 24 is connected to the operation input shaft 61 via the link 25 (discussed below). When the operator operates the joystick lever 24 to the right side by the rotational angle θin, the operation input shaft 61 and the operation spool 71 also rotate to the right around the center axis O by the rotational angle θin. Slits 71a and 71b are formed in the operation spool 71 near the operation input shaft 61 along the peripheral direction at two positions opposite each other so as to sandwich the center axis O in between.

The operation sleeve 72 has a substantially cylindrical shape and is disposed on the outside of the operation spool 71 and inside the housing 63 so as to be rotatable with respect to the operation spool 71 and the housing 63.

In this Specification, the terms right rotation and left rotation indicate the rotation direction when viewed from above.

First Spring

The first spring 64 is inserted between the operation spool 71 and the operation sleeve 72, which are rotatable with respect to each other, and generates a counterforce corresponding to the difference in rotational angle between the two.

Figure 4A:
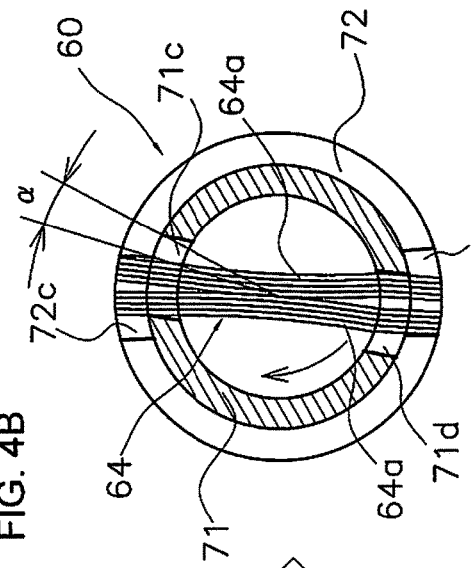
FIGS. 4A and 4B are cross sections along the AA' line in FIG. 3, and FIGS. 4C and 4D are cross sections along the BB' line in FIG. 3.

FIG. 4A is a cross section along the AA' line perpendicular to the center axis O. As shown in FIG. 4A, rectangular holes 71c and 71d are provided to the operation spool 71 on diametrically opposed walls. Rectangular grooves 72c and 72d are formed in the diametrically opposed walls at the end of the operation sleeve 72 on the operation input shaft 61 side. The first spring 64 is formed by two leaf spring units 64a in which a plurality of convex leaf springs are stacked. The two leaf spring units 64a are disposed so that their convex parts are opposite each other so as to form an X shape as in FIG. 4A. The two leaf spring units 64a go through the holes 71c and 71d in the operation spool 71, and both ends thereof go into the grooves 72c and 72d of the operation sleeve 72. The operation spool 71 and the operation sleeve 72 are thus linked by the first spring 64.

As shown in FIG. 4A, a state in which the positions of the hole 71c and the groove 72c in the peripheral direction substantially coincide, and the positions of the hole 71d and the groove 72d in the peripheral direction substantially coincide, is a state in which the valve body component 60 is in the neutral position Np.

Figure 4B:
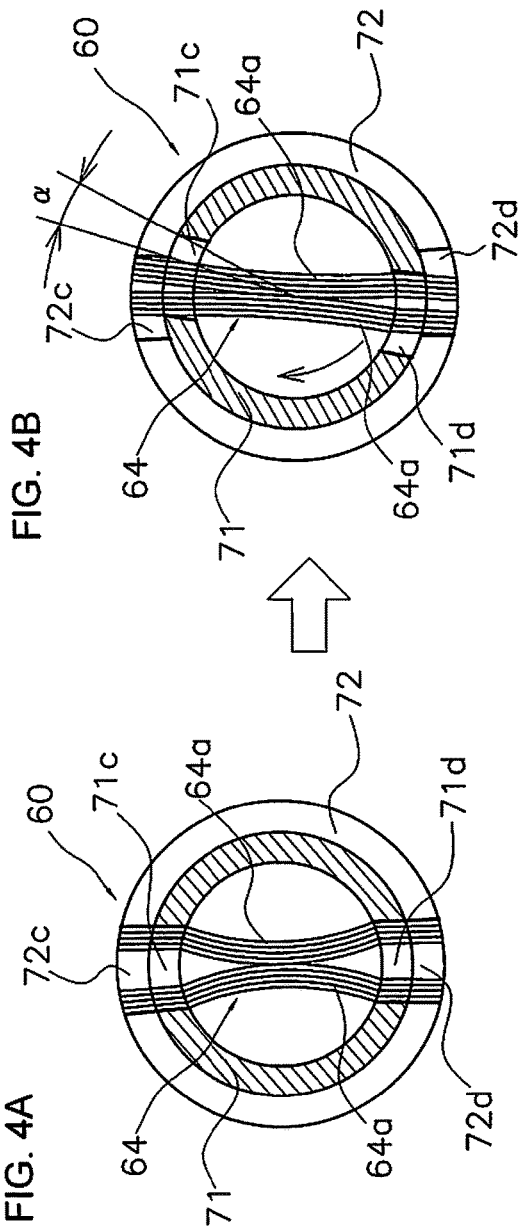

Also, when the joystick lever 24 is operated, the operation spool 71 rotates with respect to the operation sleeve 72 as shown in FIG. 4B, and the operation spool 71 moves with respect to the operation sleeve 72 to the left pilot position Lp or the right pilot position Rp. When the joystick lever 24 is rotated to the right, the operation spool 71 rotates to the right with respect to the operation sleeve 72 and moves to the right pilot position Rp. When the joystick lever 24 is rotated to the left, the operation spool 71 rotates to the left with respect to the operation sleeve 72 and moves to the left pilot position Lp.

In this movement, since the operator moves the joystick lever 24 against the spring force of the first spring 64, a lever counterforce is generated in the joystick lever 24. In other words, the first spring 64 biases the operation spool 71 to the neutral position Np with respect to the operation sleeve 72.

Feedback Component

Meanwhile, the feedback component 66 feeds back the steering angle θs of the front frame 11 with respect to the rear frame 12 to the valve body component 60. The feedback component 66 mainly has a feedback spool 73, a feedback sleeve 74, a drive shaft 75, a first center pin 76, and a restrictor 78.

The drive shaft 75 is disposed between the operation input shaft 61 and the feedback input shaft 62, coaxially with the operation input shaft 61 and the feedback input shaft 62 (center axis O). The drive shaft 75 is disposed inside the operation spool 71. The first center pin 76 is disposed perpendicular to the center axis O at the end of the drive shaft 75 on the operation input shaft 61 side. Both ends of the first center pin 76 go through the slits 71a and 71b and are fixed to the operation sleeve 72. As will be described in detail below, the first center pin 76 and the slits 71a and 71b restrict the rotational angle of the operation spool 71 with respect to the operation sleeve 72 to an angle within a predetermined range. Since the first center pin 76 is fixed to the operation sleeve 72 and the drive shaft 75, the operation sleeve 72 that is integrated with the drive shaft 75 also rotates when the drive shaft 75 is rotated.

The feedback spool 73 has a substantially cylindrical shape and is disposed coaxially with the feedback input shaft 62, and is linked to the feedback input shaft 62. Slits 73a and 73b are formed near the feedback input shaft 62 of the feedback spool 73 along the peripheral direction at two locations that are opposite each other and sandwich the central axis O in between. The drive shaft 75 is disposed inside the feedback spool 73. The feedback input shaft 62 is linked to the front frame 11 via the linking mechanism 26 (discussed below), and when the front frame 11 rotates to right by the steering angle θs with respect to the rear frame 12, the feedback input shaft 62 and the feedback spool 73 also rotate to the right by the same rotational angle θs as the steering angle θs.

The feedback sleeve 74 is substantially cylindrical in shape, and is disposed outside of the feedback spool 73 and inside the housing 63, rotatably with respect to the feedback spool 73 and the housing 63.

The restrictor 78 restricts the rotation of the feedback sleeve 74 with respect to the feedback spool 73 to an angle within a predetermined range. The restrictor 78 is made up of a second center pin 77 and walls 73ae and 73be (discussed below; see FIG. 7) at both ends in the peripheral direction of the slits 73a and 73b.

The second center pin 77 is disposed perpendicular to the center axis O, at the end of the drive shaft 75 on the feedback input shaft 62 side. Both ends of the second center pin 77 are fixed to the feedback sleeve 74 through the slits 73a and 73b. The second center pin 77 and the slits 73a and 73b restrict the rotation of the feedback sleeve 74 with respect to the feedback spool 73 to an angle within a predetermined range. Also, since the second center pin 77 is fixed to the feedback sleeve 74 and the drive shaft 75, when the feedback sleeve 74 rotates, the drive shaft 75 that is integrated with the feedback sleeve 74 also rotates. The rotation of the drive shaft 75 causes the operation sleeve 72 that is fixed to the drive shaft 75 by the first center pin 76 to rotate.

Second Spring

Figure 4C:
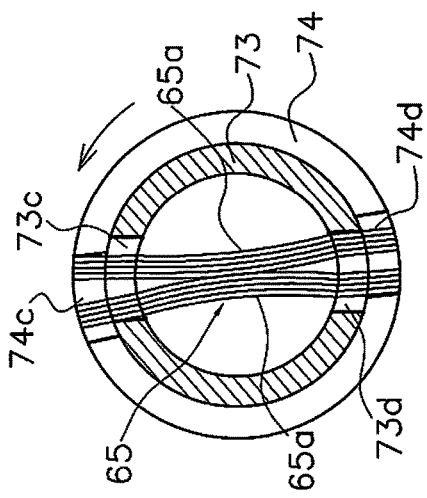

The second spring 65 is inserted between the feedback spool 73 and the feedback sleeve 74, which are able to rotate relative to each other, and generates a counterforce corresponding to the rotational difference between the two. FIG. 4C is cross section along the BB' line in FIG. 3.

As shown in FIG. 4C, square holes 73c and 73d are provided to the diametrically opposed walls of the feedback spool 73.

Also, rectangular grooves 74c and 74d are formed in the diametrically opposed walls at the end of the feedback sleeve 74 on the feedback input shaft 62 side. The second spring 65 is formed from two leaf spring units 65a in which a plurality of convex leaf springs are stacked. The two leaf spring units 65a are disposed so that their convex parts are opposite each other so as to form an X shape as in FIG. 4C. The two leaf spring units 65a go through the holes 73c and 73d in the feedback spool 73, and both ends thereof go into the grooves 74c and 74d of the feedback sleeve 74. The feedback spool 73 and the feedback sleeve 74 are thus linked by the second spring 65. In the state in FIG. 4C, the hole 73c and the groove 74c coincide in the peripheral direction, and the hole 73d and the groove 74d coincide in the peripheral direction. The feedback sleeve 74 is biased by the second spring 65 so that the positions of the grooves 74c and 74d in the peripheral direction match the positions of the holes 73c and 73d of the feedback spool 73 in the peripheral direction.

The first spring 64 bends until the operation spool 71 is restricted with respect to the operation sleeve 72, but the second spring 65 is set so that it begins to bend when subjected to a force that is greater than the counterforce produced by the first spring 64 until the operation spool 71 is restricted.

Figure 4D:
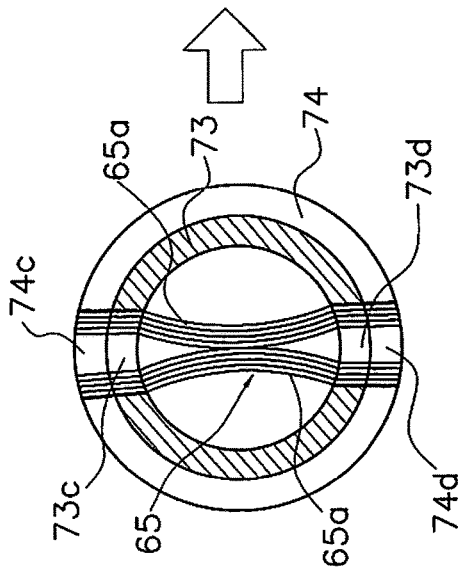
Figure 7:
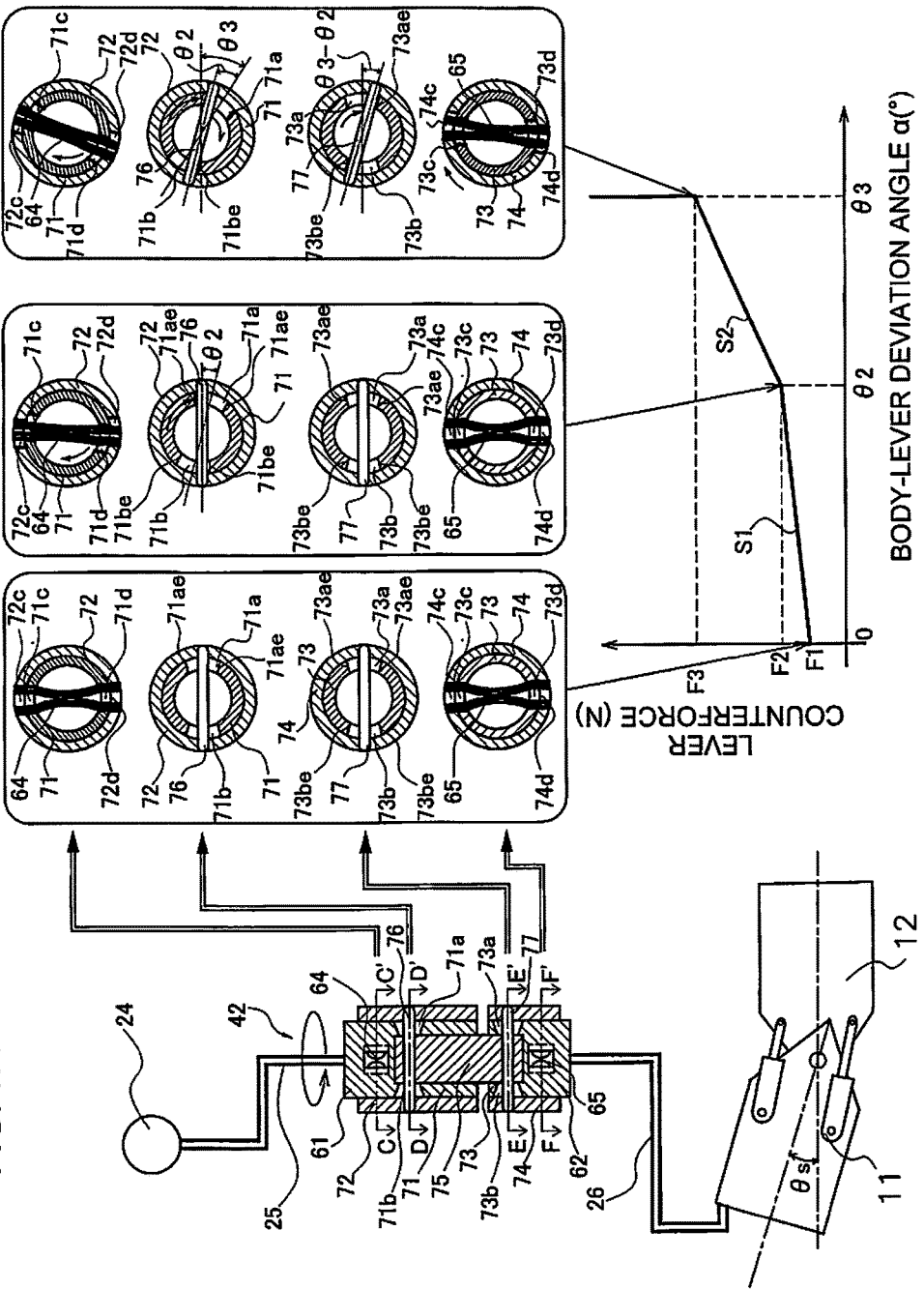
FIG. 7A is a simplified diagram of the pilot valve in FIG. 3.
FIG. 7B is a graph of the relation between the lever counterforce and the body-lever angular deviation in the pilot valve in FIG. 7A.
FIG. 7C is a cross section along the CC', DD', EE', and FF' lines in FIG. 7A when the angular deviation α is zero.
FIG. 7D is a cross section along the CC', DD', EE', and FF' lines in FIG. 7A when the angular deviation α is θ2.
FIG. 7E is a cross section along the CC', DD', EE', and FF' lines in FIG. 7A when the angular deviation α is θ3.

As described later in below through reference to FIG. 7, when the operation spool 71 rotates with respect to the operation sleeve 72 up to the angle at which the operation spool 71 is restricted, and the joystick lever 24 is then operated, as shown in FIG. 4D, the second spring 65 bends and the feedback sleeve 74 rotates with respect to the feedback spool 73. FIG. 4D is a cross section along the BB' line in FIG. 3, and since the view is from below, the arrow indicating the rotational direction is reversed from that in FIG. 4B.

That is, when the joystick lever 24 is operated past the angle at which the operation spool 71 is restricted with respect to the operation sleeve 72, the operator must operate the joystick lever 24 against the biasing force of the second spring 65.

With the above configuration of the feedback unit 66, when the feedback input shaft 62 rotates in accordance with a change in the steering angle, the feedback spool 73 rotates, and the feedback sleeve 74 that is linked to the feedback spool 73 via the second spring 65 also rotates. Then, the operation sleeve 72, which is fixed to the feedback sleeve 74 via the second center pin 77, the drive shaft 75, and the first center pin 76, also rotates, which produces a change in the difference in rotational angle between the operation spool 71 and the operation sleeve 72 and changes the pilot pressure.

That is, with the pilot valve 42, the position of the operating spool 71 with respect to the operation sleeve 72 moves to the neutral position Np, the left pilot position Lp, or the right pilot positions Rp, according to the difference α between the rotational angle θin of the operation input shaft 61 and the rotational angle θfb (matches the steering angle θs) of the feedback input shaft 62. When the rotational angle difference α is zero, the operation spool 71 is in the neutral position Np with respect to the operation sleeve 72. Also, when the operation spool 71 is in the left pilot position Lp or the right pilot positions Rp with respect to the operation sleeve 72, the pilot valve 42 changes the opening surface area through which fluid from the pilot hydraulic source 43 passes, according to the rotational angle difference α. Consequently, the pilot pressure sent from the pilot valve 42 to the steering valve 32 is adjusted according to the rotational angle difference α.

A first rotational angle sensor 101, constituted by a rotary sensor, for example, is provided to the input shaft 61. The first rotational angle sensor 101 senses the rotational angle θin of the operation input shaft 61. A second rotational angle sensor 102, constituted by a rotary sensor, for example, is provided to the feedback input shaft 62. The second rotational angle sensor 102 senses the rotational angle θfb (=θs) of the feedback input shaft 62. The rotational angles θin and θfb sensed by the first rotational angle sensor 101 and the second rotational angle sensor 102 are sent as sensing signals to the controller 28.

As discussed above, the steering angle θs at the linking shaft 13 is also sensed by a steering angle sensor 104, but since the rotational angle θfb of the feedback input shaft 62 matches the steering angle θs, the steering angle sensor 104 may be omitted.

1-2-3. Joystick Lever, Link

Figure 5:
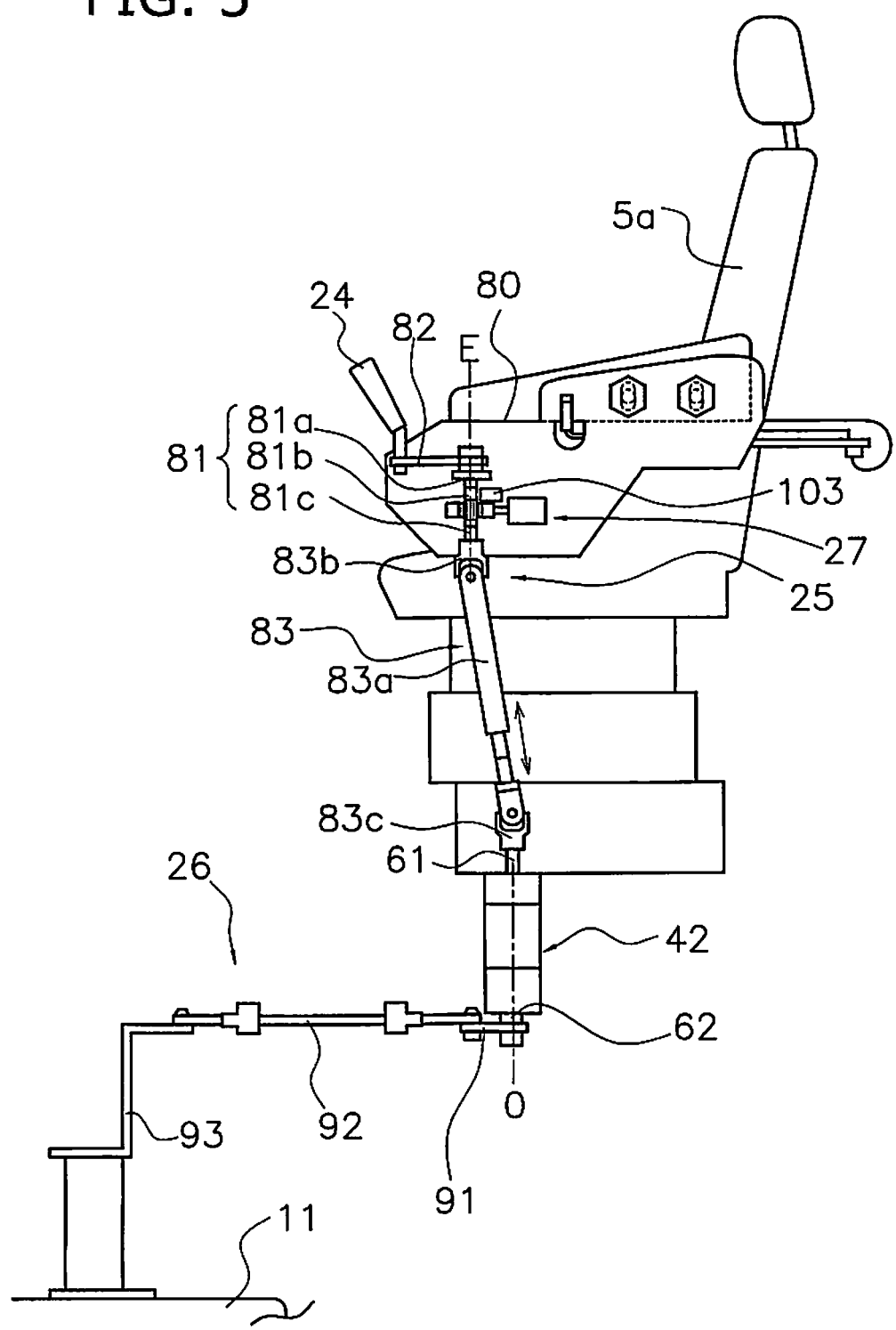
FIG. 5 is a side view of the link and linking mechanism in FIG. 2.

FIG. 5 is a side view of the configuration inside the cab 5. An operator's seat 5a in which the operator sits is provided inside the cab 5. A steering box 80 is disposed on the left side in the vehicle width direction of the operator's seat 5a.

The joystick lever 24 is disposed protruding obliquely upward toward the front from the steering box 80.

The link 25 links the joystick lever 24 and the pilot valve 42. The link 25 mainly has a steering operation shaft 81, a linking bar 82, and a universal joint 83.

The steering operation shaft 81 is disposed vertically, and is supported rotatably around its center axis E by the steering box 80. The linking bar 82 is disposed inside the steering box 80, and links the joystick lever 24 to the steering operation shaft 81.

More precisely, the steering operation shaft 81 is made up of a lever-side shaft 81a, an input shaft 81b, and a valve-side shaft 81c that are connected in that order (see FIG. 8 discussed below). That is, one end of the lever-side shaft 81a is linked to the linking bar 82, and the other end of the lever-side shaft 81a is linked to one end of the input shaft 81b. The other end of the input shaft 81b is connected to one end of the valve-side shaft 81c, and the other end of the valve-side shaft 81c is connected to the universal joint 83. An assist force or a counterforce from the force imparting component 27 (discussed below) is inputted to the input shaft 81b.

The universal joint 83 links the steering operation shaft 81 to the operation input shaft 61 of the pilot valve 42 disposed near the operator's seat 5a. The universal joint 83 has a telescoping center portion 83a and joint portions 83b and 83c disposed at both ends of the center portion 83a. The joint portion 83b is linked to the steering operation shaft 81. The joint portion 83c is linked to the operation input shaft 61.

Figure 6:
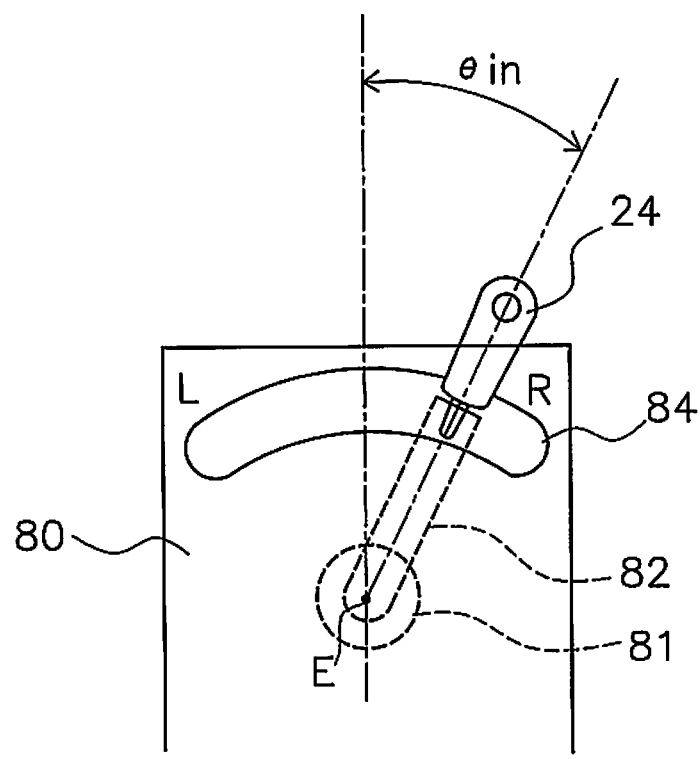
FIG. 6 shows joystick lever in FIG. 5 as seen from above.

FIG. 6 is a plan view of the area near the joystick lever 24 as seen from above. As shown in FIG. 6, the joystick lever 24 is formed protruding obliquely upward from an arc-shaped hole 84 formed in the upper face of the steering box 80. The joystick lever 24 is capable of turning horizontally around the steering operation shaft 81 (more precisely, the center axis E). Also, the edge of the right end of the hole 84 of the steering box 80 is marked with an R, and the edge of the left end is marked with an L.

For example, as shown in FIG. 6, when the operator rotates joystick lever 24 by the rotational angle θin to the right from the center position, the steering operation shaft 81 also rotates to the right by the rotational angle θin. This rotation of the steering operation shaft 81 by the rotational angle θin is transmitted through the universal joint 83 to the operation input shaft 61, and the operation input shaft 61 also rotates to the right by the rotational angle θin. The same applies when the joystick lever 24 is rotated to the left.

1-2-4. Linking Mechanism

The linking mechanism 26 has a follow-up lever 91, a follow-up link 92, and a bracket 93. The follow-up link 92 is fixed to the feedback input shaft 62 of the pilot valve 42. The bracket 93 is fixed to the front frame 11. The follow-up link 92 is linked to the follow-up lever 91 and the bracket 93.

This linking mechanism 26 links the front frame 11 to the pilot valve 42 disposed on the rear frame 12.

The linking mechanism 26 makes the steering angle θs of the front frame 11 with respect to the rear frame 12 be the same as the rotational angle θfb of the feedback input shaft 62.

That is, when the front frame 11 rotates to the right side around the linking shaft 13 with respect to the rear frame 12 by the steering angle θs, the feedback input shaft 62 also rotates right by the rotational angle θs via the linking mechanism 26, and when the front frame 11 rotates to the left side by the steering angle θs, the feedback input shaft 62 also rotates left by the rotational angle θs via the linking mechanism 26.

1-2-5. Lever Counterforce

The lever counterforce produced by the first spring 64 and the second spring 65 when the joystick lever 24 is operated will now be described.

FIG. 7A is a simplified diagram of the pilot valve 42. FIG. 7B is a graph of the relation between lever counterforce and the body-lever angular deviation. The body-lever angular deviation α is the difference (θin −θfb) between the rotational angle θin of the joystick lever 24 and the steering angle θs of the front frame 11 with respect to the rear frame 12. FIG. 7C is a cross section along the CC', DD', EE', and FF' lines in FIG. 7A when the angular deviation α is zero. FIG. 7D is a cross section along the CC', DD', EE', and FF' lines in FIG. 7A when the angular deviation α is θ2, and FIG. 7E is a cross section along the CC', DD', EE', and FF lines in FIG. 7A when the angular deviation α is θ3. As shown in FIG. 7A, the cross sections along the CC', DD', EE', and FF' lines are all as seen from above. In FIG. 7B, play in the joystick lever 24 is not taken into account in order to make the illustration easier to understand.

When the operator rotates the joystick lever 24 by the rotational angle θin from the center position, the operation input shaft 61 also rotates by the rotational angle θin. Meanwhile, since the response of the steering cylinders 21 and 22 is delayed, the steering angle θs increases gradually in accordance with the rotational angle θin. The rotational angle θin of the joystick lever 24 represents the target steering angle, while the steering angle θs indicates the actual steering angle. The feedback input shaft 62 also rotates by the same rotational angle θs in response to a change in the steering angle θs. The feedback spool 73 also rotates together with the feedback input shaft 62, and this rotation causes the feedback sleeve 74 linked via the second spring 65 to rotate as well.

Since the feedback sleeve 74 and the operation sleeve 72 are integrated with the first center pin 76, the second center pin 77, and the drive shaft 75, rotation of the feedback sleeve 74 causes the operation sleeve 72 to rotate as well.

Specifically, the difference between the rotational angle of the operation spool 71 and the rotational angle of the operation sleeve 72 corresponds to the angular deviation α (see FIG. 4B).

Since the first spring 64 biases the operation spool 71 to the neutral position Np with respect to the operation sleeve 72, the joystick lever 24 must be operated against the biasing force of the first spring 64 in order to increase the angular deviation α.

The first spring 64 has the spring property S1 shown in FIG. 7B. With the spring property S1 of the first spring 64, the joystick lever 24 must be operated with a force at or above an initial counterforce F1 (the force required to begin to bend the first spring 64) in order to rotate the operation input shaft 61. Also, with the spring property S1 of the first spring 64, the lever counterforce increases in proportion to the angular deviation α. That is, as the angular deviation α increases, the force required to operate the joystick lever 24 increases.

As shown in FIG. 7C, in the neutral position Np where the angular deviation α is zero, the first center pin 76 is disposed in the center of the slits 71a and 71b of the operation the spool 71. The second center pin 77 is disposed in the center of the slits 73a and 73b of the feedback spool 73.

The joystick lever 24 is then rotated to the right side, for example, to increase the angular deviation α, and when the angular deviation α reaches the angle θ2, as shown in FIG. 7D, the first center pin 76 hits the wall 71ae formed in the peripheral direction of the slit 71a, and the wall 71be formed in the peripheral direction of the slit 71b. At this point the second center pin 77 is disposed in the center of the slits 73a and 73b of the feedback spool 73. This is because if we let F2 be the counterforce produced by the first spring 64 when the angular deviation α is the angle θ2, the initial counterforce (the force needed to start bending the second spring 65) is set to F2 as indicated by the spring property S2 of the second spring 65. The initial counterforce of the second spring 65 may be set higher than F2, or may be greater than or equal to F2.

Furthermore, the operator must operate the joystick lever 24 against the counterforce of the second spring 65 to rotate it to the right side. That is, when the joystick lever 24 is further rotated to the right side, since the first center pin 76 is hitting the walls 71ae and 71be, it is necessary to rotate the operation sleeve 72 if an attempt is made to rotate the operation spool 71. Also, as discussed above, the operation sleeve 72 is integrated with the feedback sleeve 74, and the feedback spool 73 is connected to the feedback input shaft 62. Therefore, when the joystick lever 24 is further rotated to the right side, the operator operates against the counterforce of the second spring 65, as shown in FIG. 4D.

When the angular deviation α reaches θ3, as shown in FIG. 7E, the second center pin 77 hits the wall 73ae formed in the peripheral direction of the slit 73a and the wall 73be formed in the peripheral direction of the slit 73b. Thus, the second center pin 77 is able to rotate by an angle (θ3−θ2). That is, the pilot valve 42 is configured so that the angular deviation α will not exceed the angle θ3. Therefore, as shown in FIG. 7B, the lever counterforce goes straight up at the angle θ3. If the second center pin 77 strikes the walls 73ae and 73be with sufficient energy, a sharp rebound will be generated to put a burden on the operator's wrist. This angle θ3 is also referred to as the catch-up angle.

In FIG. 7B, an example was illustrated in which the joystick lever 24 was rotated to the right side, but the same applies when the rotation is to the left side, in which case the angular deviation α becomes a negative value, in left and right symmetry as indicated by the two-dot chain line L7 shown in FIG. 10B (discussed below). That is, the first center pin 76 hits the walls 71ae and 71be at an angle of −θ2, and the second center pin 77 hits the walls 73ae and 73be at −θ3. Thus, the pilot valve 42 is configured so that the absolute value of the angular deviation α will not exceed the angle θ3.

Until the angular deviation α reaches θ2, there will be a difference between the rotational angle of the operation spool 71 and the rotational angle of the operation sleeve 72, but once the angle θ2 is exceeded, there is no longer any difference between the rotational angles of the operation spool 71 and the operation sleeve 72, so the aperture of the pilot valve 42 stays constant. Also, while the aperture of the pilot valve 42 remains constant when the angular deviation α is between the angles θ2 and θ3, the pilot pressure should be varied according to the angular deviation by controlling the variable pressure reducer 41.

1-2-6. Force Imparting Component

Figure 8:
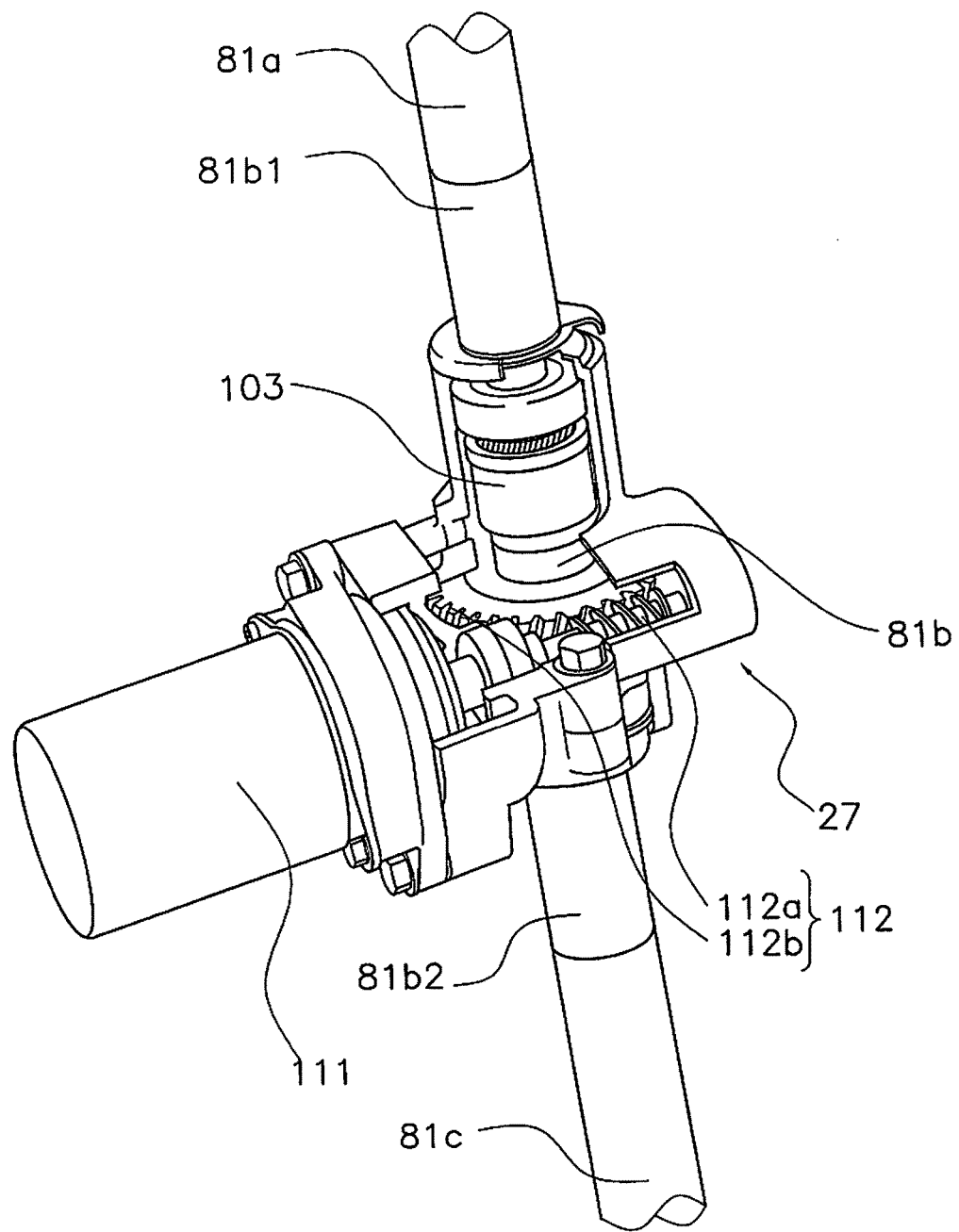
FIG. 8 is an oblique view of the configuration of the force imparting component in FIG. 2.

FIG. 8 is an oblique view of the force imparting component 27. The force imparting component 27 imparts an assist force or counterforce to the operation of the joystick lever 24. The force imparting component 27 has an electric motor 111 and a worm gear 112. The worm gear 112 has a cylindrical worm 112a and a worm wheel 112b. The worm wheel 112b is provided around the above-mentioned input shaft 81b, and meshes with the cylindrical worm 112a. The output shaft of the electric motor 111 is connected to the cylindrical worm 112a, and rotates the cylindrical worm 112a around its center axis. The electric motor 111 is driven on the basis of a command from a drive circuit 204 provided to the controller 28.

The first end 81b1 of the input shaft 81b is connected to the lever-side shaft 81a, and the second end 81b2 is connected to the valve-side shaft 81c.

When the electric motor 111 is driven, the cylindrical worm 112a rotates, this rotation causes the worm wheel 112b to rotate, and rotational force is also produced at the input shaft 81b that is fixed to the worm wheel 112b. Rotational force can be applied for left rotation or right rotation to the input shaft 81b by changing the direction of rotation of the cylindrical worm 112a.

For example, when the joystick lever 24 is rotated to the right, an assist force is imparted to the operation of the joystick lever 24 by applying a force in the right rotation direction to the input shaft 81b. Also, when the joystick lever 24 is rotated to the right, a counterforce is imparted to the operation of the joystick lever 24 by applying a force in the left rotation direction to the input shaft 81b.

A torque sensor 103 is provided to the input shaft 81b. The torque sensor 103 senses the torque generated at the input shaft 81b exerted on the joystick lever 24 by the operator. The torque sensor 103 in this embodiment, for example, senses the torque generated at the input shaft 81b and the rotation direction of the input shaft 81b by sensing the twisting of a torsion bar with a coil, for example. The sensed rotation direction and torque T are outputted to the controller 28 as a steering torque signal.

1-2-7. Controller

FIG. 9 is a block diagram of the configuration of the controller 28. As shown in FIG. 9, the controller 28 includes a storage unit 200, a first assist torque deciding component 201, a second assist torque deciding component 202, a calculator 203, and a drive circuit 204. The first assist torque deciding component 201, the second assist torque deciding component 202, and the calculator 203 are executed by a CPU or another such computing device.

The storage unit 200 stores the relation of the imparted assist torque with respect to lever input torque (first assist torque information) for each speed. The storage unit 200 also stores the relation of imparted assist torque with respect to the deviation angle α (second assist torque information). The first assist torque information and the second assist torque information are preset. The first assist torque information and the second assist torque information will be discussed in detail below. The storage unit 200 may be provided inside the controller 28, or may be provided outside the controller 28. Also, the storage unit 200 is made up of a RAM, a ROM, an HDD, or the like.

The first assist torque deciding component 201 decides the first assist torque from the steering torque signal from the torque sensor 103 and the speed signal from the vehicle speed sensor 105 on the basis of the first assist torque information stored in the storage unit 200.

The second assist torque deciding component 202 calculates the difference between the rotational angle θin sensed by the first rotational angle sensor 101 and the rotational angle θfb (=θs) sensed by the second rotational angle sensor 102, and calculates the deviation angle α (θin−θfb). The second assist torque deciding component 202 decides the second assist torque from the deviation angle α on the basis of the second assist torque information stored in the storage unit 200.

The calculator 203 calculates the sum of the first assist torque decided by the first assist torque deciding component 201 and the second assist torque decided by the second assist torque deciding component 202, and calculates the target assist torque to be imparted to the input shaft 81b.

The drive circuit 204 drives the electric motor 111 on the basis of the calculated target assist torque.

Thus, the controller 28 can impart an assist force or counterforce to the operation of the joystick lever 24 by the operator on the basis of the torque T, the deviation angle α, and the speed V. The controller 28 also controls the variable pressure reducer 41 as shown in FIG. 2 on the basis of the rotational angle θin, the rotational angle θfb (=θs), and the vehicle speed V. This allows the source pressure of the pilot pressure sent to the pilot valve 42 to be controlled so that the flow of fluid to the left and right steering cylinders 21 and 22 does not change abruptly.

Also, control of the electric motor 111 and the variable pressure reducer 41 by the controller 28 may be performed by wire or wirelessly.

2. Operation

The steering operation with the wheel loader 1 in this embodiment will now be described.

2-1. Steering Operation

If the joystick lever 24 is in the center position, the operation input shaft 61 is located in a predetermined initial position, and the rotational angle θin produced by the operation input shaft 61 is zero. Also, since the steering angle θs is zero, the feedback input shaft 62 is also located in a predetermined initial position. In this embodiment, as shown in FIG. 7A, the steering angle θs indicates the angle from a state in which the angle along the longitudinal direction with respect to the rear frame 12 is zero. As shown in FIG. 6, the rotational angle θin indicates the rotational angle from the center position of the joystick lever 24. Also, in finding the angular deviation, computation may be performed using a positive angle for rotation to the right and a negative angle for rotation to the left, for example.

At this point, the operation spool 71 is located in the neutral position Np shown in FIG. 4A with respect to the operating sleeve 72. In this case, the pilot pressure in the first pilot chamber 34 and in the second pilot chamber 35 of the steering valve 32 is the same, and the valve body 33 of the steering valve 32 is also in the neutral position Ns. Therefore, no fluid is supplied or discharged to or from the left and right steering cylinders 21 and 22, the steering angle θs is maintained at zero, and the rotational angle θft (=θs) of the feedback input shaft 62 is also maintained at zero.

Next, the operator exerts an operation force Fin to rotate the joystick lever 24 to the right side from the center position as shown in FIG. 6. When the operating force Fin exceeds F1 of the first spring 64, the operation input shaft 61 rotates to the right the same as the joystick lever 24, and the rotational angle θin of the first operation input shaft 61 is increased. At this point, because of the delay in the response of the left and right steering cylinders 21 and 22, the steering angle θs is still at zero, and the rotational angle θfb (=θs) of the feedback input shaft 62 is also zero. Therefore, the angular deviation (α=θin−θs) between the rotational angle θin and the steering angle θs increases.

The operation spool 71 rotates to the right with respect to the operation sleeve 72 together with the rotation of the operation input shaft 61. Here, the operation sleeve 72 is integrated with the feedback sleeve 74, and the feedback sleeve 74 is linked to the feedback spool 73 by the second spring 65. The initial counterforce F2 of the second spring 65 is at or above the counterforce of the spring property S1 of the first spring 64 shown in FIG. 7B. Therefore, the operation sleeve 72 does not rotate along with the operating spool 71, and operating the spool 71 rotates to the right with respect to the operation sleeve 72.

Thus, the operating spool 71 rotates to the right with respect to the operation sleeve 72 and moves to the right pilot positions Rp, pilot pressure is supplied to the second pilot port P8, and the pilot pressure is supplied to the second pilot chamber 35.

Thus, the valve body 33 of the steering valve 32 moves to the right steering position Rs, fluid is supplied to the extension port 21a of the steering cylinder 21 and the contraction port 22b of the steering cylinder 22, and fluid is discharged from the contraction port 21b of the steering cylinder 21 and the extension port 22a of the steering cylinder 22. This gradually increases the steering angle θs, and the front frame 11 is oriented in the right direction with respect to the rear frame 12 (see R in FIG. 2). This change in the steering angle θs is transmitted by the linking mechanism 26 to the feedback input shaft 62, and the feedback input shaft 62 rotates at the rotational angle θs.

When the operator stops the joystick lever 24 at a predetermined rotational angle θ1, the operation input shaft 61 also stops at the rotational angle θ1. On the other hand, since the steering angle θs is gradually increasing, the rotational angle θs of the feedback input shaft 62 also increases. The feedback spool 73 also rotates along with the feedback input shaft 62, and the feedback sleeve 74 linked via the second spring 65 to the feedback spool 73 also rotates. Since the feedback sleeve 74 is integrated with the operation sleeve 72 via the first center pin 76, the second center pin 77, and the drive shaft 75, the operation sleeve 72 also rotates along with the rotation of the feedback sleeve 74. Rotation of the operation sleeve 72 reduces the difference in the rotational angle (deflection angle α) between the operation sleeve 72 and the operation spool 71. When the steering angle θs (the rotational angle θs of the feedback input shaft 62) catches up with the rotational angle θ1 (the rotational angle θin of the operation input shaft 61), the angular deviation α drops to zero. At this point, the operation spool 71 of the pilot valve 42 is located in the neutral position Np with respect to the operation sleeve 72. In this case, the pilot pressure in the first pilot chamber 34 and the second pilot chamber 35 of the steering valve 32 is the same, and the steering valve 32 is also in the neutral position Ns. Therefore, no fluid is supplied or discharged to or from the left and right steering cylinders 21 and 22, and the steering angle θs is maintained at the rotational angle θ1.

When the joystick lever 24 is thus rotated to the right side and stopped at a predetermined rotational angle θ1, the steering angle θs is also maintained at the same rotational angle θ1. This keeps the front frame 11 oriented in the direction of the rotational angle θ1, to the right with respect to the rear frame 12.

When the operator then returns the joystick lever 24 from the right side position to the center position, the operation input shaft 61 similarly rotates, which reduces the rotational angle θin of the operation input shaft 61. At this point, because of the delay in the response of the left and right steering cylinders 21 and 22, the steering angle θs is still the rotational angle θ1. Therefore, the rotational angle difference α (=θin−θs) decreases from zero and becomes negative. Then, the operation spool 71 rotates to the left with respect to the operation sleeve 72 and moves to the left pilot position Lp, and pilot pressure is supplied to the first pilot port P7. Consequently, the valve body 33 of the steering valve 32 moves to the left steering position Ls, fluid is supplied to the contraction port 21b of the steering cylinder 21 and the extension port 22a of the steering cylinder 22, and fluid is discharged from the extension port 21a of the steering cylinder 21 and the contraction port 22b of the steering cylinder 22. This gradually reduces the steering angle θs from the rotational angle θ1. This change in the steering angle θs is transmitted by the linking mechanism 26 to the feedback input shaft 62, and the feedback input shaft 62 rotates at the same change in rotational angle as the change in the steering angle θs.

When the operator stops the joystick lever 24 in its center position, the operation input shaft 61 also stops at its initial position, that is, at a position where the rotational angle θin is zero. Meanwhile, since the steering angle θs is gradually decreasing from the rotational angle θ1, the difference in rotational angle (angular deviation) α decreases gradually. When the steering angle θs reaches zero, the rotational angle θfb (=θs) of the feedback input shaft 62 also reaches zero, and the rotational angle difference α becomes zero. At this point, the operation spool 71 is disposed in the neutral position Np with respect to the operation sleeve 72. In this case, the pilot pressure in the first pilot chamber 34 and the second pilot chamber 35 of the steering valve 32 is the same, and the steering valve 32 is also in the neutral position Ns. Therefore, no fluid is supplied or discharged to or from the left and right steering cylinders 21 and 22, and the steering angle θs goes back to zero and is maintained there. Consequently, the front frame 11 is returned to an orientation along the longitudinal direction with respect to the rear frame 12.

The situation is the same when the joystick lever 24 is rotated to the left side, and will therefore not be described here.

2-2. Control of Force Imparting Component

Next, control of the force imparting component 27 when the joystick lever 24 is operated as discussed above will be described.

The wheel loader 1 in this embodiment changes the assist torque to be imparted to the operation of the joystick lever 24 according to torque and speed on the basis of the first assist torque information.

Furthermore, with the wheel loader 1 in this embodiment, the assist torque is changed so a larger force will gradually be required to operate the joystick lever 24 before the operation of the joystick lever is restricted by the pilot valve 42 on the basis of the second assist torque information.

First, the first assist torque information and the second assist torque information will be described.

2-2-1. First Assist Torque Information

FIG. 10A is a graph of imparted assist torque (first assist torque information) at various vehicle speeds versus input torque. In FIG. 10A, the solid line L1 indicates the assist torque information at a vehicle speed of 0 km/h, the dotted line L2 indicates the assist torque information at a vehicle speed of 25 km/h, and the one-dot chain line L3 indicates the assist torque information at a vehicle speed of 40 km/h.

In the graph shown in FIG. 10A, a positive lever input torque indicates the torque produced by rotation of the joystick lever 24 to the right side, and a negative lever input torque indicates the torque produced by rotation of the joystick lever 24 to the left side. Also, a positive assist torque indicates when a force is applied to the input shaft 81b in the right rotation direction, and a negative assist torque indicates when a force is applied to the input shaft 81b in the left rotation direction.

Specifically, L1a indicates the assist torque when the joystick lever 24 is rotated to the right side at a vehicle speed of 0 km/h, and L1b indicates the assist torque when the joystick lever 24 is rotated to the left side at a vehicle speed of 0 km/h. L2a indicates the assist torque when the joystick lever 24 is rotated to the right side at a vehicle speed of 25 km/h, and L2b indicates the assist torque when the joystick lever 24 is rotated to the left side at a vehicle speed of 25 km/h. L3a indicates the assist torque when the joystick lever 24 is rotated to the right side at a vehicle speed of 40 km/h, and L3b indicates the assist torque when the joystick lever 24 is rotated to the left side at a vehicle speed of 40 km/h.

L1a, L2a, and L3a show the case when the joystick lever 24 is rotated to the right side, and since the assist torque here is a positive value, a force is applied to the input shaft 81b for the right rotation. L1b, L2b, and L3b show the case when the joystick lever 24 is rotated to the left side, and since the assist torque is a negative value, a force is applied to the input shaft 81b for the left rotation. An assist force is thus imparted to the operation of the joystick lever 24.

Also, L1a and L1b are symmetrical with respect to the origin, L2a and L2b are symmetrical with respect to the origin, and L3a and L3b are symmetrical with respect to the origin. Therefore, the assist force with respect to the absolute value of the input torque is in left and right symmetry.

FIG. 10B is a graph of lever counterforce versus body-lever deviation angle when the assist torque shown in FIG. 10A is and is not imparted. In FIG. 10B, a positive deviation angle α indicates when the joystick lever 24 is moved to the right side, and a negative deviation angle α indicates when the joystick lever 24 is moved to the left side. That is, as shown in FIG. 7E, the angle θ3 indicates the angle at which the operation is restricted when the joystick lever 24 is rotated in the right rotation direction, and the angle −θ3 indicates the angle at which the operation is restricted when the joystick lever 24 is rotated in the left rotation direction. As shown in FIG. 7D, the angle θ2 indicates the angle at which the first center pin 76 strikes the walls 71ae and 71be when the joystick lever 24 is rotated in the right rotation direction, and the angle −θ2 indicates the angle at which the first center pin 76 strikes the walls 71ae and 71be when the joystick lever 24 is rotated in the left rotation direction.

The solid line L4 indicates lever counterforce versus deviation angle at a vehicle speed of 0 km/h, the dotted line L5 indicates lever counterforce versus deviation angle at a vehicle speed of 25 km/h, and the one-dot chain line L6 indicates lever counterforce versus deviation angle at a vehicle speed of 40 km/h. Also, in FIG. 10B, the two-dot chain line L7 indicates when the assist torque is not imparted. The two-dot chain line L7 in FIG. 10B shows the same state as in FIG. 7B.

As shown in FIG. 10B, L4 to L7 are in line symmetry with respect to the vertical axis, and in L4 to L6, an assist force is imparted symmetrically to left and right operations, and the lever counterforce is smaller than when no assist torque is imparted (L7).

Also, the lever counterforce is set to increase as the speed goes up. This makes it possible to achieve both good operability at low speed and good running stability at high speed.

2-2-2. Second Assist Torque Information

The second assist torque information indicates the assist torque to be imparted to mitigate the recoil that suddenly occurs at the joystick lever 24 due to the restriction of the pilot valve 42. FIG. 11A is a graph of the assist torque (second assist torque information) with respect to the body-lever deviation angle (α). Again in FIG. 11A, a positive body-lever deviation angle α (=θin −θs) indicates when the joystick lever 24 is operated to the right side, and a negative body-lever deviation angle α indicates when the joystick lever 24 is operated to the left side. Also, a positive assist torque indicates when a force is applied to the input shaft 81b for the right rotation, and a negative assist torque indicates when a force is applied to the input shaft 81b for the left rotation.

With the second assist torque information shown in FIG. 11A, a counterforce is generated when the deviation angle α reaches an angle of ±θ4, and the assist torque is set so that the counterforce increases exponentially as the absolute value of the deviation angle increases.

More precisely, with the second assist torque information, when the joystick lever 24 is rotated to the right side and the deviation angle α reaches an angle of +θ4, the assist torque is set so as to apply a force to the input shaft 81b in the left rotation direction. When the joystick lever 24 is rotated to the left side and the deviation angle α reaches an angle of −θ4, the assist torque is set so as to apply a force to the input shaft 81b in the right rotation direction. The angle θ4 is set between the angles θ2 and θ3 shown in FIG. 11A. The angle −θ4 is set between −θ2 and −θ3.

Figure 11B:
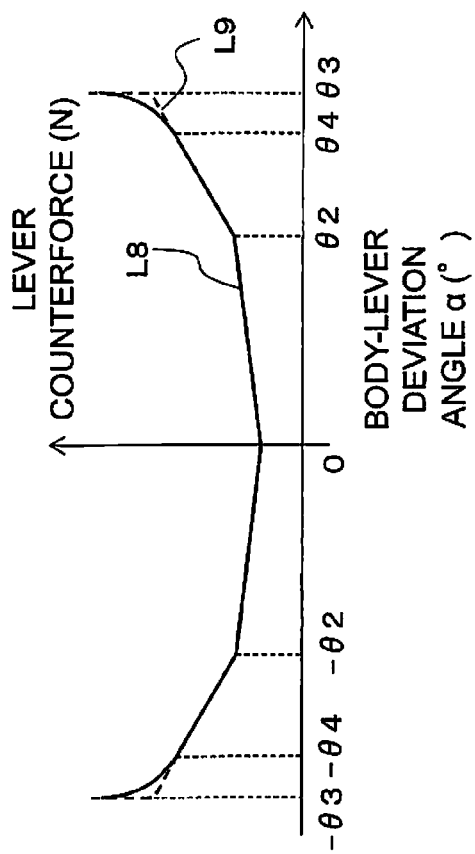
FIG. 11B is a graph of lever counterforce versus body-lever deviation angle when assist torque is and is not imparted on the basis of the second assist torque information in FIG. 11A.
Figure 11A:
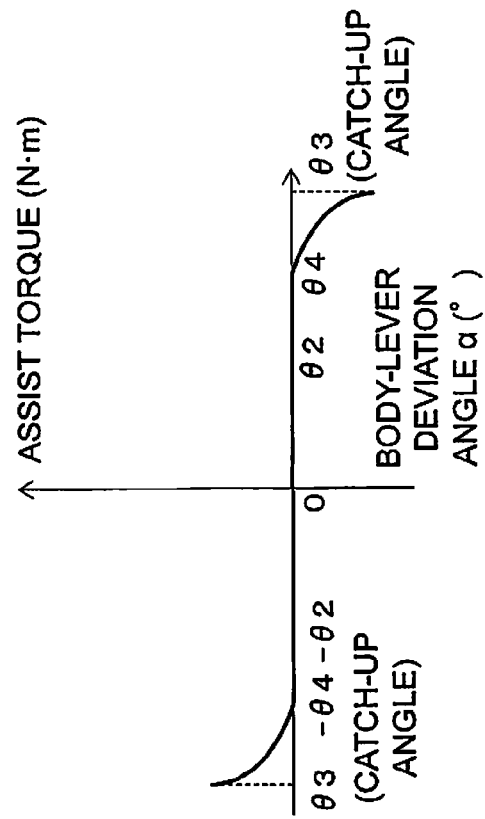
FIG. 11A is a graph of second assist torque information (imparted assist torque versus body-lever deflection angle) stored in the storage unit in FIG. 9.

FIG. 11B is a graph of lever counterforce versus body-lever deviation angle when assist torque is and is not imparted on the basis of the second assist torque information shown in FIG. 11A. The solid line L8 indicates when the assist torque is imparted, and the dotted line L9 indicates when the assist torque is not imparted.

As shown in FIG. 11B, when the deviation angle α reaches the angle ±θ4 and the absolute value of the angle becomes large, the lever counterforce increases exponentially.

Because the counterforce in thus exponentially increased, the operation of the joystick lever 24 becomes heavier as the second center pin 77 approaches the walls 73ae and 73be, so the second center pin 77 does not strike the walls 73ae and 73be with as much momentum.

2-2-3. Control Operation

Figure 12:
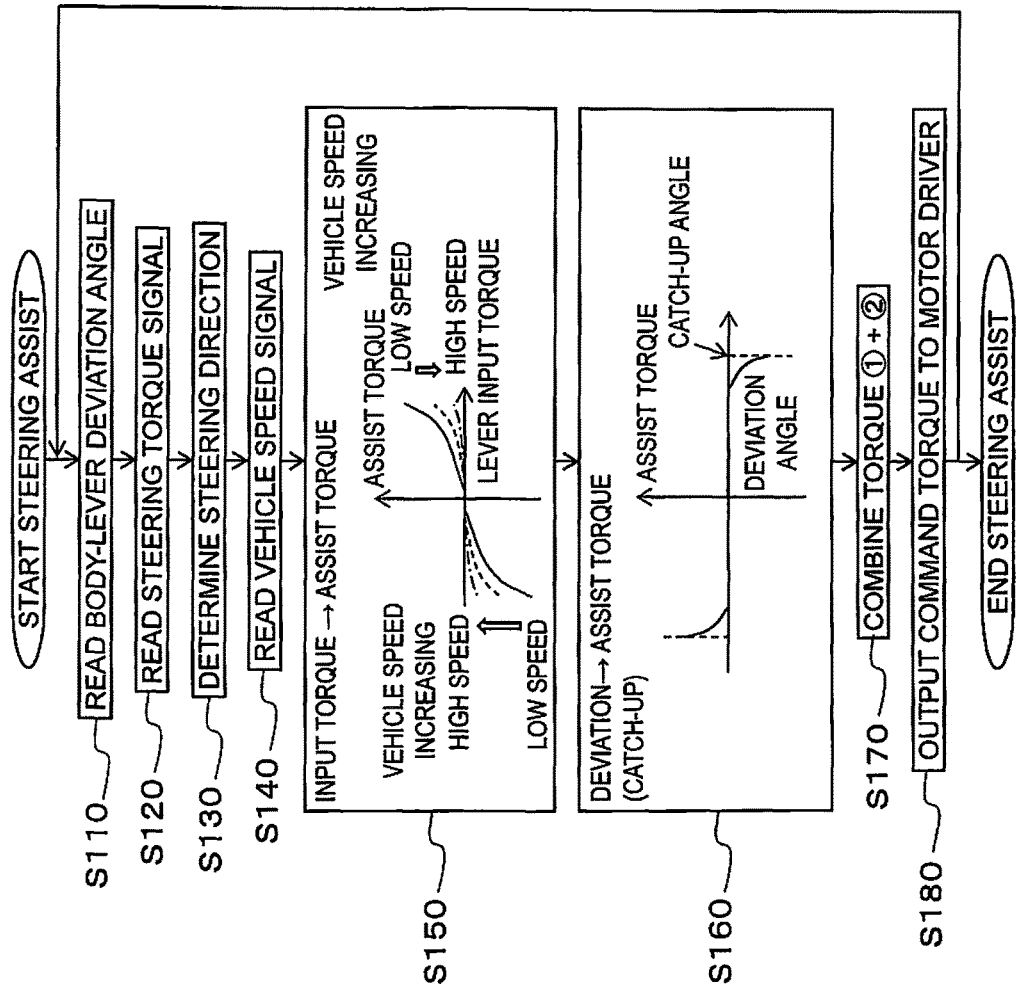
FIG. 12 is a flowchart of the method for controlling a wheel loader in an embodiment of the present invention.

FIG. 12 is a flowchart of the control operation of the force application unit 27.

When the joystick lever 24 is operated, in step S110 the second assist torque deciding component 202 of the controller 28 acquires the rotational angle θin of the operation input shaft 61 from the first rotational angle sensor 101, and acquires the rotational angle θfb (=θs) of the feedback input shaft 62 from the second rotational angle sensor 102. The second assist torque deciding component 202 then calculates the deviation angle α (=θin−θs).

Next, in step S120 the first assist torque deciding component 201 of the controller 28 receives a steering torque signal from the torque sensor 103. The steering torque signal includes information related to the amount of torque and the rotation direction. For example, information related to the amount of torque and the rotation direction can be included in the torque value, so that if the torque has a positive value, it means the torque is produced by the right rotation of the input shaft 81b, and if the torque has a negative value, it means the torque is produced by the left rotation of the input shaft 81b.

Next, in step S130 the controller 28 determines the steering direction of the joystick lever 24 on the basis of the steering torque signal. The rotation direction of the electric motor 111 when a force is imparted can be determined by this steering direction.

Then, in step S140 the first assist torque deciding component 201 of the controller 28 acquires a signal for the vehicle speed V from the vehicle speed sensor 105.

Next, in step S150 the first assist torque deciding component 201 decides the first assist torque on the basis of the first assist torque information stored in the storage unit 200.

Figure 13:
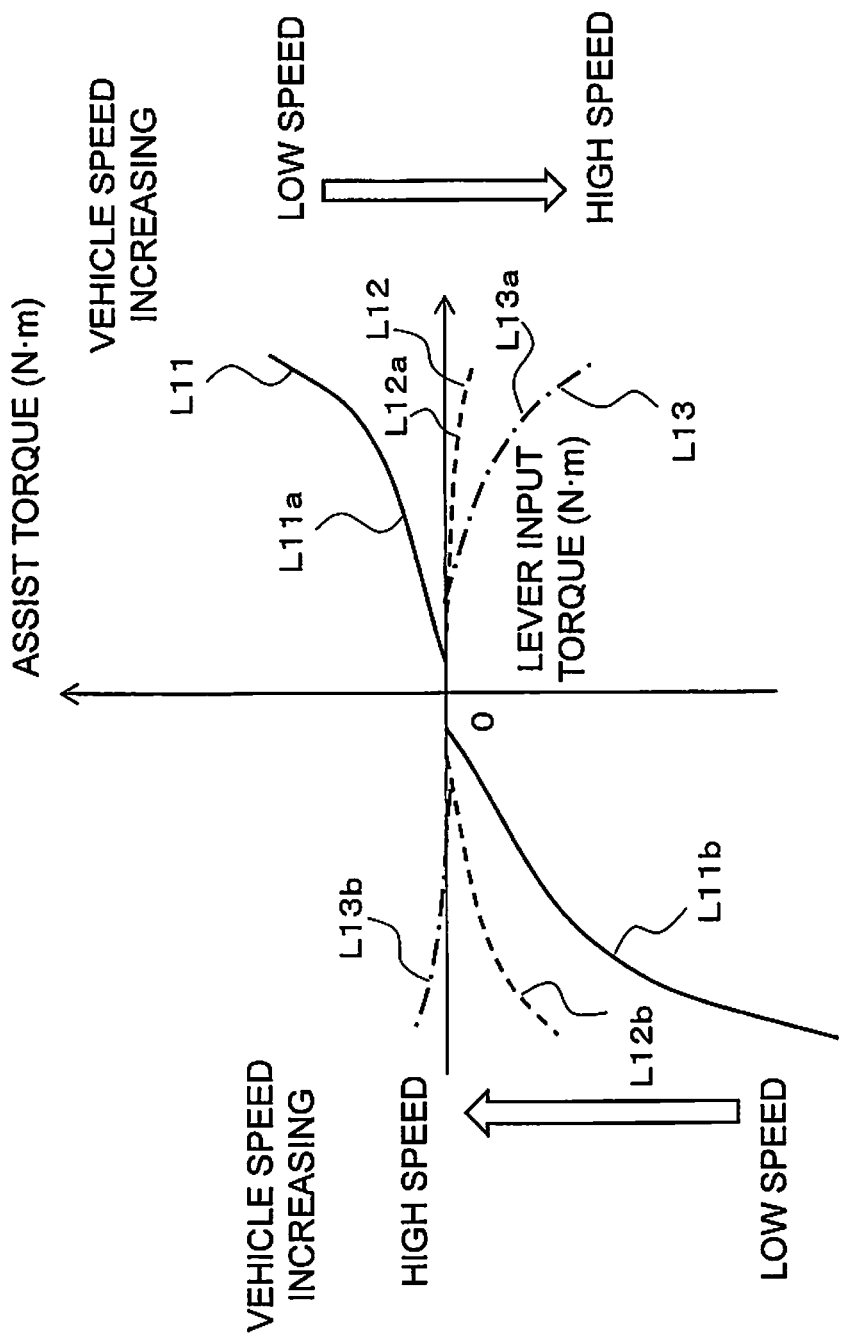
FIG. 13 is a graph of first assist torque information provided for each speed in a modification example of an embodiment of the present invention.

The controller 28 stores the three sets of first assist torque information shown in FIG. 13 (at vehicle speeds of 0 km/h, 25 km/h, and 40 km/h). If the sensed value from the vehicle speed sensor 105 is among the three speeds (for example, 12 km/h), the controller 28 calculates the assist torque at that speed by interpolation. The controller 28 thus decides the first assist torque by interpolation. The assist torque can be varied continuously according to the speed change by calculating the first assist torque by the interpolation.

Next, in step S160, the second assist torque deciding component 202 decides the second assist torque on the basis of the second assist torque information shown in FIG. 11A from the deviation angle α calculated in step S110.

Next, in step S170 the calculator 203 combines the first assist torque and the second assist torque to calculate the target assist torque. Here, the target assist torque is a positive or negative value, and also includes information about the rotation direction. For instance, when the rotation is to the right, an assist force is imparted with the first assist torque information shown in FIG. 10A, but with the second assist torque information shown in FIG. 11A, a counterforce is imparted once the deviation angle α exceeds the angle θ4. The calculator 203 combines these values, and if the absolute value of the counterforce is greater than the absolute value of the assist force, the target assist torque becomes a negative value, and a force obtained by subtracting the absolute value of the assist force from the absolute value of the counterforce is imparted in the left rotation direction. On the other hand, if the absolute value of the assist force is greater than the absolute value of the counterforce, the target assist torque becomes a positive value, and a force obtained by subtracting the absolute value of the counterforce from the absolute value of the assist force is imparted in the right rotation direction.

Next, in step S180 the controller 28 outputs a command torque signal to the drive circuit 204 on the basis of the decided target assist torque. Consequently, the electric motor 111 is driven, and a force is imparted to the operation of the joystick lever 24 via the link 25.

3. Features, Etc.

(1)

The wheel loader 1 in this embodiment (an example of a work vehicle) is an articulated type in which the front frame 11 and the rear frame 12 are linked. The wheel loader 1 comprises the steering cylinders 21 and 22 (an example of a hydraulic actuator), the joystick lever 24, the pilot valve 42 (an example of a control valve), the force imparting component 27, and the controller 28. The steering cylinders 21 and 22 are driven hydraulically and change the steering angle θs of the front frame 11 with respect to the rear frame 12. The joystick lever 24 is operated by the operator. The pilot valve 42 is linked to the joystick lever 24 and controls the flow of fluid supplied to the steering cylinders 21 and 22 according to the deviation angle α (an example of an operation amount) produced by operation of the joystick lever, and restricts the deviation angle α produced by the joystick lever 24 to between −θ3 and +θ3 (an example of a predetermined range). The force imparting component 27 imparts an assist force or a counterforce to operation of the joystick lever by the operator. The controller 28 controls the force imparting component 27 so as to decrease the assist force or increase the counterforce before the operation of the joystick lever 24 is restricted by the pilot valve 42.

Consequently, as shown in FIGS. 11A and 11B, the operating force required to operate the joystick lever 24 increases before the operation of the joystick lever 24 is restricted. That is, since the tactile sensation gradually becomes heavier before the joystick lever 24 is restricted, the operation slows down as the restricted position is approached. Therefore, the sudden recoil produced by displacement restriction of the pilot valve 42 can be mitigated.

(2)

With the wheel loader 1 in this embodiment (an example of a work vehicle), the rotational angle θin of the joystick lever 24 corresponds to the target steering angle θs of the front frame 11 with respect to the rear frame 12. The wheel loader 1 further comprises the first rotational angle sensor 101 (an example of a target steering angle sensor) and the second rotational angle sensor 102 (an example of an actual steering angle sensor). The first rotational angle sensor 101 senses the rotational angle θin (an example of a target steering angle). The second rotational angle sensor 102 senses the rotational angle θfb (=θs) (an example of the actual steering angle). The pilot valve 42 restricts movement of the joystick lever 24 when the absolute value of the deviation angle α (an example of an angular difference), which is the difference between the rotational angle θin (an example of a target steering angle) and the steering angle θs (an example of the actual steering angle) becomes the angle θ3 (an example of a first predetermined angular difference). The controller 28 controls the force imparting component 27 so as to gradually decrease the assist force or gradually increase the counterforce toward the angle +θ3 or −θ3, on the basis of the deviation angle α.

Thus, the approach to the restricted position is detected from the deviation angle α of the rotational angle θin and the rotational angle θfb (=θs), and the operating force required to operate the joystick lever 24 can be increased before the operation of the joystick lever 24 is restricted.

(3)

With the wheel loader 1 in this embodiment (an example of a work vehicle), the pilot valve 42 (an example of a control valve) has the operation input shaft 61 (an example of a first input member), the feedback input shaft 62 (an example of a second input member), the restrictor 78, the first spring 64 (an example of a biasing component), and the second spring 65 (an example of a biasing component). The operation input shaft 61 is linked to the joystick lever 24 and is displaced according to the operation of the joystick lever 24. The feedback input shaft 62 is displaced according to the steering angle θs (an example of the actual steering angle). The restrictor 78 restricts the deviation angle α (an example of an operation amount) produced by the operation of the joystick lever 24 to an angle between −θ3 and +θ3 by restricting displacement of the operation input shaft 61 to an angle between −θ3 and +θ3 (an example of a predetermined range). The first spring 64 and the second spring 65 bias the operation input shaft 61 to the neutral position Np at which the rotational angle θin (an example of an amount of displacement) of the operation input shaft 61 matches the rotational angle θfb (=θs) (an example of an amount of displacement) of the feedback input shaft 62. The difference between the rotational angle of the rotational angle θin of the operation input shaft 61 and the rotational angle θfb (=θs) of the feedback input shaft 62 corresponds to the deviation angle α. The joystick lever 24 is operated against the biasing force of the first spring 64 and the second spring 65.

Consequently, after the joystick lever 24 has been operated, the actual steering angle θs changes to follow the joystick lever 24, and the pilot valve 42 goes into the neutral position when the rotational angle θin of the joystick lever 24 matches the steering angle θs.

Also, the first spring 64 and the second spring 65 are thus provided to the pilot valve 42, and the operator operates the joystick lever 24 with an operating force that goes against the biasing force produced by the first spring 64 and the second spring 65. The operating force required to operate the joystick lever 24 can be increased by decreasing the assist force or increasing the counterforce before restriction, to the operation against this biasing force.

(4)

With the wheel loader 1 in this embodiment (an example of a work vehicle), the restrictor 78 has the second center pin 77 (an example of a striking member) and the walls 73ae and 73be (an example of a struck member). The second center pin 77 is linked to the operation input shaft 61 and is displaced according to displacement of the operation input shaft 61. More precisely, the second center pin 77 is displaced according to displacement of the operation input shaft 61 after the deviation angle α of the operation input shaft 61 and the feedback input shaft 62 goes past the angle θ2 shown in FIG. 7B. The walls 73ae and 73be are formed on the feedback spool 73 (an example of a connected member) connected to the feedback input shaft 62, and are struck by the second center pin 77. The second center pin 77 strikes the walls 73ae and 73be when the difference α in the rotational angle of the operation input shaft 61 with respect to the feedback input shaft 62 reaches a value corresponding to the angle θ3 (first predetermined angle difference), and displacement of the input shaft 61 with respect to the feedback input shaft 62 is restricted.

Consequently, the difference in the amount of displacement of the operation input shaft 61 with respect to the feedback input shaft 62 is restricted to an angle between −θ3 and +θ3 (an example of within a predetermined angle difference range).

(5)

The wheel loader 1 in this embodiment (an example of a work vehicle) further comprises the torque sensor 103. The torque sensor 103 senses the torque produced by operation of the joystick lever 24. The controller 28 controls the force applying unit 27 on the basis of the torque sensor 103.

Consequently, a force can be imparted according to the torque applied by the operator to the joystick lever 24. For example, the amount of force that is imparted can be controlled so that the assist force imparted by the force imparting component 27 is increased when the torque applied to the joystick lever 24 by the operator is high, and the assist force is decreased when the torque is low.

(6)

With the wheel loader 1 in this embodiment (an example of a work vehicle), the controller 28 has the calculator 203 and the drive circuit 204 (an example of an operation controller). The calculator 203, as shown in FIG. 9, calculates the force to be imparted to the operation of the joystick lever 24 by combining the imparted force preset for the sensed torque with the counterforce preset for the angular difference.

Consequently, the operating force required to operate the joystick lever 24 can be increased before the operation of the joystick lever 24 is restricted, while an assist force or a counterforce is imparted by the force imparting component 27 to operation of the joystick lever 24.

(7)

The wheel loader 1 in this embodiment (an example of a work vehicle) further comprises the vehicle speed sensor 105 (an example of a speed sensor). The speed sensor 105 (an example of a speed sensor) senses the speed of the wheel loader 1. The calculator 203, as shown in FIG. 9, calculates the force to be imparted to the operation of the joystick lever 24 by changing the imparted force preset for the torque on the basis of the sensed speed, and combining this changed imparted force with a counterforce preset for the angular difference.

Consequently, the force imparted to the operation of the joystick lever 24 by the force imparting component 27 according to torque can also be changed according to the speed of the vehicle, and furthermore, the operating force required to operate the joystick lever 24 can be increased before the operation of the joystick lever 24 is restricted.

(8)

The work vehicle 1 in this embodiment further comprises the link 25. The link 25 links the joystick lever 24 to the pilot valve 42. The force imparting component 27 has the electric motor 111 and the worm gear 112 (an example of a transmission mechanism). The electric motor 111 generates the assist force or the counterforce. The worm gear 112 transmits the assist force or the counterforce produced by the electric motor 111 to the link 25.

Consequently, the force of the electric motor 111 can be transmitted to the link 25 that links the joystick lever 24 to the pilot valve 42, and the force required to operate the joystick lever 24 can be changed.

(9)

The method for controlling the wheel loader 1 in this embodiment (an example of a work vehicle) is a method for controlling an articulated wheel loader in which the front frame 11 and the rear frame 12 are linked, said method comprising step S170 (an example of a load increasing step). This step S170 (an example of a load increasing step) involves decreasing the assist force or increasing the counterforce imparted to the operation of the joystick lever 24 before the operation of the joystick lever 24 is restricted by the pilot valve 42 (an example of a control valve) that controls the flow of fluid supplied to the steering cylinders 21 and 22 (an example of a hydraulic actuator) that change the steering angle θs of the front frame 11 with respect to the rear frame 12, according to the rotational angle θin of the joystick lever 24 (an example of an operation amount).

Consequently, the operating force required to operate the joystick lever 24 is increased before the operation of the joystick lever 24 is restricted. Specifically, since the tactile sensation gradually becomes heavier from before the joystick lever 24 is restricted, the operation speed slows down as the joystick lever 24 approaches the restricted position. Accordingly, the sudden recoil produced by displacement restriction of the pilot valve 42 can be mitigated.

Other Embodiments

An embodiment of the present invention was described above, but the invention is not limited to or by the above embodiment, and various modifications are possible without departing from the gist of the present invention.

(A)

With the wheel loader 1 in the above embodiment, when the absolute value of the torque with respect to left and right operations of the joystick lever 24 is the same, the same assist force is imparted, but the assist force may be different for left and right operations of the joystick lever 24.

FIG. 13 is a graph of first assist torque information when the assist force applied to the left rotation operation of the joystick lever 24 is greater than the assist force applied to the right rotation operation of the joystick lever 24. In FIG. 13, the solid line L11 indicates the assist torque information at a vehicle speed of 0 km/h, the dotted line L12 indicates the assist torque information at a vehicle speed of 25 km/h, and the one-dot chain line L13 indicates the assist torque information at a vehicle speed of 40 km/h. Also, L11a, L12a, and L13a indicate the assist torque when the joystick lever 24 is rotated to the right side at 0 km/h, 25 km/h, and 40 km/h, and L11b, L12b, and L13b indicate the assist torque when the joystick lever 24 is rotated to the left side at 0 km/h, 25 km/h, and 40 km/h.

The assist torque information (L11), the assist torque information (L12), and the assist torque information (L13) shown in FIG. 13 are set so that rotating the joystick lever 24 to the right side will require more operating force than rotating it to the left side. For instance, as indicated by L11a and L11b for the assist torque information (L11) at a vehicle speed of 0 km/h, when the absolute value of the lever input torque is the same, the absolute value of the assist torque is set to be higher in the left rotation (L11b) than in the right rotation (L11a).

In operating the joystick lever 24, it is generally easier for an operator to bend his wrist to the inside than to the outside. In this embodiment, as shown in FIG. 5, since the joystick lever 24 is disposed on the left side of the operator's seat 5a, the joystick lever 24 is easier to rotate to the right side than to the left side. Therefore, as shown in FIG. 13, rotation to the right side is set to require more operating force than rotation to the left side, which allows the tactile sensation to be equal to the right and left.

Also, with the assist torque information (L12) at a vehicle speed of 25 km/h, as indicated by L12a, the counterforce is set to be imparted to the right rotation operation of the joystick lever 24. That is, the force imparting component 27 imparts force in the left rotation direction to the input shaft 81b for the right rotation operation of the joystick lever 24. On the other hand, as indicated by L12b, an assist force is set to be imparted to the left rotation operation of the joystick lever 24. That is, for the left rotation operation of the joystick lever 24, the force imparting component 27 imparts a force in the left rotation direction to the input shaft 81b.

Also, with the assist torque information (L13) at a vehicle speed of 40 km/h, as indicated by L13a, the counterforce is set to be imparted to clockwise operation of the joystick lever 24. That is, the force imparting component 27 imparts force in the left rotation direction to the input shaft 81b for the right rotation operation of the joystick lever 24. As indicated by L13b, a counterforce is also set to be imparted to counterclockwise operation of the joystick lever 24. That is, for the left rotation operation of the joystick lever 24, the force imparting component 27 imparts a force in the right rotation direction to the input shaft 81b. The absolute value of the counterforce is set to be greater in the right rotation of the joystick lever 24 than in the left rotation.

The target assist torque may be calculated by combining the above-mentioned first assist torque information and the second assist torque information shown in FIG. 11A.

(B)

In the above embodiment, the controller 28 stored first assist torque information for three speeds (0 km/h, 25 km/h, and 40 km/h), the speeds are not limited to these. The first assist torque information is not limited to three sets, and there may be only two, or four or more. When the assist torque is smoothly varied according to speed, it is preferable for three or more sets of information to be provided.

(C)

In the above embodiment, the controller 28 stored three sets of first assist torque information, and the assist torque was continuously varied according to the speed by interpolation, but it may instead varied in steps.

For instance, let the first assist torque information at low speed be the solid line L11 in FIG. 13, the first assist torque information at medium speed be the dotted line L12 in FIG. 13, and the first assist torque information at high speed be the one-dot chain line L13 in FIG. 13. Then, for example, let the low speed be less than 15 km/h, the medium speed be at least 15 km/h and less than 25 km/h, and the high speed be at least 25 km/h and no more than 40 km/hour. Also, for example, 15 km/h can be set as a first threshold, and 25 km/h as a second threshold.

In such a case, when the joystick lever 24 is operated, the controller 28 compares the speed sensed by the vehicle speed sensor 105 to the first threshold and the second threshold, and determines whether or not the vehicle speed corresponds to low, medium, or high speed. The first assist torque information at the determined speed is then used to decide a first assist torque from the steering torque signal. The number of stages is not limited to three, may be divided into only two stages, and may also be divided up more finely into more than three stages.

(D)

With the wheel loader 1 in the above embodiment, first assist torque information was provided for each speed, but it need not be provided for each speed. That is, the first assist torque may be decided on the basis of only the sensed value from the torque sensor 103.

Also, in deciding the first assist torque, with the above embodiment, the operation direction of the joystick lever 24 was sensed by the torque sensor 103, but the operation direction may be sensed using the lever-body deviation angle α in step S110.

Also, the body-lever deflection angle α may be calculated from the rotational angle θin sensed by the first rotational angle sensor 101 and the steering angle θs sensed by the steering angle sensor 104, without using the value sensed by the second rotational angle sensor 102.

Furthermore, the body-lever deflection angle α may be calculated from the rotational angle θin sensed by the first rotational angle sensor 101 and the steering angle θs calculated from the values sensed by the cylinder stroke sensors 106 and 107.

(E)

In the above embodiment, the target assist torque for driving the electric motor 111 was found by combining the second assist torque information (FIG. 11A) with the first assist torque information (FIG. 10A), but assist torque may be imparted using just the second assist torque information, without using the first assist torque information. In this case, no force is imparted from the force imparting component 27 to the operation of the joystick lever 24 until the deviation angle α reaches an angle of ±θ4, and assist torque corresponding to the second assist torque in FIG. 11A is imparted while the deviation angle α is between angles of −θ3 and −θ4 and between angles of +θ3 and +θ4.

Also, in this case, as mentioned in the (A) above, the assist force may be changed for left and right operations of the joystick lever 24. For instance, the counterforce for operation toward the inside with respect to the operator's seat 5a (operation to right side in the above embodiment) may be set higher than the counterforce for operation toward the outside with respect to the operator's seat 5a (operation to left side in the above embodiment).

(F)

In the above embodiment, the assist torque was increased exponentially from the angle +θ3 toward +θ4, and the assist torque was decreased exponentially from the angle −θ4 toward −θ3, but this is not the only option, and the assist torque may be increased or decreased linearly.

(G)

In the above embodiment, two springs (the first spring 64 and the second spring 65) were provided, but the second spring 65 need not be provided. In this case, for example, the part between the feedback spool 73 and the feedback sleeve 74 may be fixed.

Also, if the second spring 65 is not provided, when the deviation angle α reaches an angle of ±θ2 (see FIG. 7B), the first center pin 76 will strike the walls 71ae and 71be and rotation of the operation input shaft 61 with respect to the feedback input shaft 62 will be restricted, in which case the first center pin 76 and the walls 71ae and 71be constitute an example of the restrictor. That is, the second assist torque information may be set so that the angle +θ2 becomes the catch-up angle and the counterforce increases toward the catch-up angle.

(H)

In the above embodiment, the amount of fluid supplied from the steering valve 32 to the steering cylinders 21 and 22 was controlled according to the pilot pressure inputted from the pilot valve 42 (an example of a control valve), but the configuration may be such that the fluid from the pilot valve 42 is supplied directly to the steering cylinders 21 and 22.

(I)

In the above embodiment, a force was generated by the electric motor 111, but instead of an electric motor, a hydraulic motor or the like may be used. In other words, it should be an actuator or the like with which the force to be imparted can be generated.

(J)

In the above embodiment, the drive circuit 204 was included in the controller 28, but it need not be included in the controller 28, and only the drive circuit 204 may be mounted by itself. Furthermore, the drive circuit 204 may be mounted to an electric motor.

(K)

In the above embodiment, the wheel loader 1 was given as an example of a work vehicle, but a wheel loader is not the only option, and may instead be an articulated dump truck, motor grader, or the like, so long as it is an articulated work vehicle.

INDUSTRIAL APPLICABILITY

The work vehicle and method for controlling a work vehicle of the present invention have the effect of mitigating sudden recoil produced by displacement restriction of the valve, and are useful in a wheel loader or the like.

The invention claimed is:

1. A work vehicle, the work vehicle being articulated with a front frame and a rear frame linked to the front frame, the work vehicle comprising:
   a hydraulic actuator driven hydraulically and configured to change a steering angle of the front frame with respect to the rear frame;
   a joystick lever configured to be operated by an operator;
   a control valve linked to the joystick lever, the control valve being configured to
      control flow of fluid supplied to the hydraulic actuator according to an operation amount of the joystick lever, and
      restrict the operation amount of the joystick lever to a predetermined range;
   a force imparting component configured to impart an assist force or a counterforce to the operation of the joystick lever by the operator; and
   a controller configured to control the force imparting component so as to decrease the assist force or increase the counterforce before the operation of the joystick lever is restricted by the control valve.

2. The work vehicle according to claim 1, further comprising:
   a target steering angle sensor; and
   an actual steering angle sensor,
   a rotational angle of the joystick lever corresponding to a target steering angle of the front frame with respect to the rear frame,
   the target steering angle sensor being arranged and configured to sense the target steering angle,
   the actual steering angle sensor being arranged and configured to sense the actual steering angle,
   the control valve restricting the movement of the joystick lever when an angular difference between the target steering angle and the actual steering angle reaches a first predetermined angle difference, and
   the controller being further configured to control the force imparting component so that the assist force is gradually decreased or the counterforce is gradually increased toward the first predetermined angle difference, based on the angular difference.

3. The work vehicle according to claim 2, wherein the control valve includes
   a first input member linked to the joystick lever and configured to be displaced according to the operation of the joystick lever,
   a second input member configured to be displaced according to the actual steering angle,
   a restrictor that restricts displacement of the first input member to within a predetermined range and thereby restricts the operation amount of the joystick lever to within the predetermined rang; and
   a biasing component biasing the first input member to a neutral position in which an amount of displacement of the first input member matches an amount of displacement of the second input member, a difference between the amount of displacement of the first input member and the amount of displacement of the second input member corresponds to the angular difference, and the joystick lever is operated against the biasing force of the biasing component.

4. The work vehicle according to claim 3, wherein the restrictor includes a striking member linked to the first input member and configured to be displaced according to the displacement of the first input member, and a struck member formed on a member connected to the second input member and configured to be struck by the striking member, when the difference in the amount of displacement of the first input member with respect to the second input member reaches a value corresponding to the first predetermined angle difference, the striking member strikes the struck member and displacement of the first input member with respect to the second input member is restricted.

5. The work vehicle according to claim 2, further comprising:

a torque sensor configured to sense torque produced by operation of the joystick lever, the controller being configured to control the force imparting component based on the torque sensor.

6. The work vehicle according to claim 5, wherein the controller includes a calculator configured to calculate the force to be imparted to the operation of the joystick lever by combining an imparted force preset for the sensed torque with a counterforce preset for the angular difference, and an operation controller configured to actuate the force imparting component so as to impart the calculated force.

7. The work vehicle according to claim 6, further comprising:

a speed sensor configured to sense speed of the work vehicle, the calculator calculating the force to be imparted to the operation of the joystick lever by changing the imparted force preset for the torque based on the sensed speed, and combining this changed imparted force with a counterforce preset for the angular difference.

8. The work vehicle according to claim 1, further comprising:

a link linking the joystick lever to the control valve, the force imparting component including
an electric motor configured to generate the assist force or the counterforce, and
a transmission mechanism configured to transmit the assist force or the counterforce produced by the electric motor to the link.

9. A method for controlling an articulated work vehicle with a front frame and a rear frame linked to the front frame, the method comprising:

decreasing an assist force or increasing a counterforce to be imparted to an operation of a joystick lever before operation of the joystick lever is restricted, a control valve being configured to control a flow of fluid supplied to a hydraulic actuator configured to change a steering angle of the front frame with respect to the rear frame according to an operation amount of the joystick lever.

* * * * *